United States Patent [19]
Minechika et al.

[11] Patent Number: 6,014,494
[45] Date of Patent: Jan. 11, 2000

[54] METHOD OF RECORDING IMAGE DATA

[75] Inventors: Shigekazu Minechika, Kishiwada; Kazuyuki Okamoto, Kyoto; Osami Sunagawa, Osaka; Masahiko Nishikawa, Nara; Takashi Ohnaka, Moriguchi; Hirotsugu Murashima, Yamatotakada; Tatsuo Tanaka, Tsuzuki-gun, all of Japan

[73] Assignee: Sanyo Electric Co., Ltd., Osaka, Japan

[21] Appl. No.: 08/975,167

[22] Filed: Nov. 20, 1997

Related U.S. Application Data

[63] Continuation of application No. 08/697,874, Aug. 30, 1996, abandoned.

[30] Foreign Application Priority Data

Aug. 31, 1995 [JP] Japan ................................ 7-248667
Aug. 31, 1995 [JP] Japan ................................ 7-248668

[51] Int. Cl.[7] .................................................. H04N 5/783
[52] U.S. Cl. ............................................. 386/81; 386/108
[58] Field of Search ........................ 386/6–8, 33, 68, 386/81, 108, 111, 112, 131; H04N 5/76, 5/783, 5/92, 9/79

[56] References Cited

U.S. PATENT DOCUMENTS 5,377,051  12/1994  Lane et al. ................................ 386/81

FOREIGN PATENT DOCUMENTS

| | | |
|---|---|---|
| 596527 | 5/1994 | European Pat. Off. . |
| 606857 | 7/1994 | European Pat. Off. . |
| 644691 | 3/1995 | European Pat. Off. . |
| 683611 | 11/1995 | European Pat. Off. . |
| 685966 | 12/1995 | European Pat. Off. . |
| 692916 | 1/1996 | European Pat. Off. . |
| 735781 | 10/1996 | European Pat. Off. . |
| WO9176314 | 8/1994 | WIPO . |

OTHER PUBLICATIONS

Naofumi Yanagihara, et al., "A Recording Method of ATV Data on a Consumer Digital VCR", Personal Video Group, SONY Corporation, Sony Intelligent Systems Research Laboratory, SONY Electrons Inc.

Primary Examiner—Thai Tran
Attorney, Agent, or Firm—Loeb & Loeb, LLP

[57] ABSTRACT

In tracing a tape with a signal recording head to form tracks having digital data recorded thereon, a plurality of tracks provide each of blocks, and a usual playback data area NA and trick playback areas TH and TL are arranged on each of the tracks included in each block. The trick playback areas are enlarged to provide increment areas TA with a decrease in the bit rate of usual playback data. In recording image data as to a plurality of programs on a tape conjointly, signal recording tracks are formed on the tape, and a usual playback data area and a trick playback data area are formed on each of the tracks or on one track per plurality of tracks, as arranged longitudinally of the track, whereby the image data as to programs A to D is conjointly recorded on the same tape. In this method, a number of tracks in accordance with the number of speed multiplication for trick playback provide one TP frame, the same trick playback data is repeatedly recorded from track to track in the trick playback data areas of the tracks within the same TP frame, and the image data as to the programs A to D is cyclically recorded in such respective TP frames, each for one program.

9 Claims, 24 Drawing Sheets

FIG. 3

| PRIORITY ORDER | TRACK LOCATION | ADDED AREA |
|---|---|---|
| ① | f0 TRACK PRECEDING f1 TRACK | 67 - 71 |
| | | 72 - 76 |
| | | 77 - 81 |
| ② | f0 TRACK PRECEDING f1 TRACK | 57 - 61 |
| | | 89 - 93 |
| | | 94 - 98 |
| | | 31 - 35 |
| ③ | f0 TRACK PRECEDING f1 TRACK | 48 - 52 |
| | | 53 - 57 |
| | | 99 - 103 |
| | f2 TRACK | 36 - 40 |
| | | 41 - 45 |
| | f1 TRACK | 106 - 110 |
| | | 111 - 115 |
| ④ | f0 TRACK PRECEDING f1 TRACK | 111 - 115 |
| | f2 TRACK | 46 - 50 |
| | f1 TRACK | 101 - 105 |

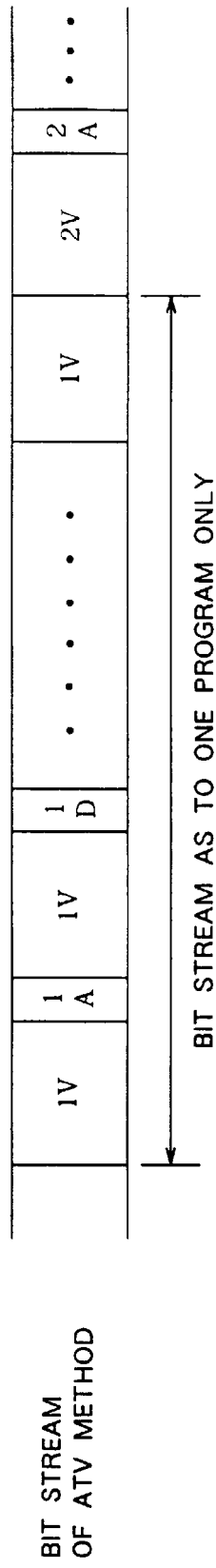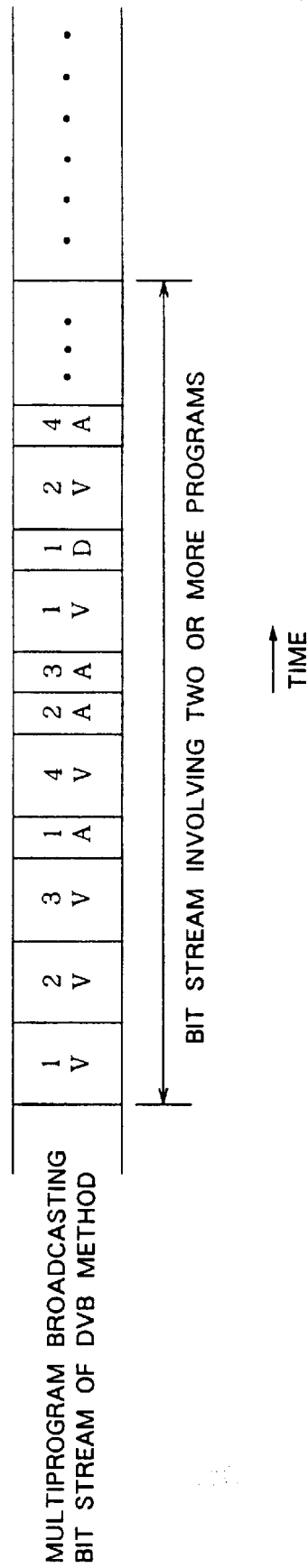

METHOD OF RECORDING IMAGE DATA

This is a continuation of application Ser. No. 08/697,874 filed on Aug. 30. 1996, now abandoned.

FIELD OF THE INVENTION

The present invention relates to a method of recording on a tape digitized image data converted from an image signal, and more particularly to an image data recording method which makes possible trick playback.

BACKGROUND OF THE INVENTION

The ATV (Advanced Television) standards proposed for the next-generation digital broadcasting system of the U.S. are to adopt the MPEG (Moving Picture Image Coding Experts Group) method, which is an international standard for image compression, as a compression method for use in transmitting image data. DVB (Digital Video Broadcasting), the next-generation broadcasting of Europe, is also going to adopt the MPEG method.

For data coding, the MPEG system uses motion-compensated prediction, DCT (discrete cosine transform) and variable-length coding. As shown in the frame structure of FIG. 21, pictures are classified into three types, i.e., I pictures (intra-coded) pictures, P (predictive coded) pictures and B (bi-directionally predictive coded) pictures, according to the time-base prediction node. The I picture is an intraframe coded picture, the P picture is an interframe predictive coded picture which is predicted from a frame ahead in time, and the B picture is all interframe predictive picture predicted from frames preceding and following the current frame.

FIG. 22 shows the hierarchical structure of image data of the MPEG method. The structure comprises the following layers as arranged from below upward.

Block Layer

A block comprises 8×8 pixels which are adjacent in luminance or color difference, and DCT is performed in the unit of block.

Macroblock Layer

A macroblock comprises six blocks, i.e., adjacent four luminance blocks and two color difference blocks Cb, Cr coinciding in position on the screen.

Slice Layer

A slice comprises a plurality of macroblocks arranged successively in the order of image scanning.

Picture Layer

A picture comprises a plurality of slices to form an image. Pictures are classified into I pictures, P pictures and B pictures according to the coding method as previously stated.

GOP Layer

GOP (group of pictures) comprises one or a plurality of I pictures, and zero or a plurality of non-I pictures.

Video Sequence Layer

A video sequence comprises one or a plurality of GOPs which are identical in image size, image rate or the like.

On the other hand, studies are conducted by the HD (High Definition) Digital VCR Conference on the standardization of digital VTRs for recording video signals as digital data and reproducing video signals. In this connection, it is thought feasible to record on magnetic tapes data of ATV standards (ATV signals) subjected to image compression by the MPEG method, or DVB signals.

FIG. 23 shows the standard signal recording format used for digital VTRs. As illustrated, the track formed on the signal bearing surface of a magnetic tape 71 comprises an ITI area containing insert data and track data, aural data area, image data area and subcode data area. In PAL mode, 360 tracks are recorded on the magnetic tape per second, and the image of one frame is recorded with use of 12 tracks on the average.

Data is recorded in units which are termed sync blocks. Recordable in the image data area of one track are 135 sync blocks. As shown in FIG. 24, each sync block comprises a sync data area (2 bytes), ID data area (3 bytes), image data area (77 bytes) and parity area (8 bytes), i.e., 90 bytes in total.

In the case where MPEG data is recorded in the image data area, the MPEG bit stream input is recorded in the form of the data hierarchy shown in FIG. 22 and includes macroblock units. These macro-blocks are not definite in code length and are recorded along with upper layers, so that the sync block described and the macroblock to be recorded are not in a definite relationship. Thus, the position on the screen that is determined by the macroblock is irrelevant to the position on the recording track pattern that is determined by the sync block.

In the case where a magnetic tape having data thus recorded thereon is caused to travel at a speed different from the recording speed for trick playback, for example, for high-speed playback, the head scans the tape over a plurality of tracks, so that the MPEG data obtained is not successive but fragmentary. The MPEG bit stream includes P pictures and B pictures which are interframe predictive coded pictures as previously stated, with the result that the fragmentary data available fails to reconstruct images.

Stated more specifically, trick playback pictures can be reconstructed only from I pictures which are intraframe predictive coded pictures, and for the reconstruction from I pictures, all I picture data distributed over the track needs to be retrieved in the correct order. Accordingly, the method wherein the MPEG bit stream input is recorded as it is infeasible for trick playback.

"A Recording Method of ATV Data on a Consumer Digital VCR," a paper delivered at "International Workshop On HDTV '93" held in October, 1993 discloses a method which is known as a method of trick playback in digital VTRs.

With this method, specific areas are provided within the image data area of each track, and I picture data is recorded in the specific areas as trick playback data aside from usual playback data. This method of recording is feasible because the data rate for the ATV signal is about 19.4 Mbps, whereas the image data area of one track according to the standards of the HD Digital VCR Conference is adapted for recording at a data rate of about 24.9 Mbps, so that a region corresponding to about 5,.5 Mbps remains as a surplus recordable area. The surplus area corresponds to about 32 SBs (sync blocks) relative to the image data area of one track which corresponds to 135 SBs.

Stated more specifically with reference to FIG. 25, provided in the image data area of one track are data areas NPA for usual playback, and data areas TPA for trick playback at three locations on the track, i.e., at front, central and rear portions thereof. Of the 135 SBs for the image data area of one track, 32 SBs in total are assigned to the three trick playback data areas TPA.

In this case, trick playback data is assigned by the method shown in FIG. 26. First, macroblocks of I pictures A, B, C, ... are extracted from an MPEG bit stream as shown in FIG. 26(a) to obtain a row of data A', B', C', ... as seen in FIG. 26(b). The macroblocks as coded are different in code length. The data row A', B', C', . . . is then successively assigned to sync blocks SB1, SB2, SB3, . . . as shown in FIG. 26(c). These sync blocks have a definite code length and are therefore not in a definite relationship with the macroblocks; one macroblock will correspond to a plurality of sync blocks.

The same trick playback data is recorded on tracks which are equal in number to the maximum number of speed multiplication, n, to be set for trick playback. For example, when n=5, the same data is recorded in the track play data areas PTA of five successive tracks as shown in FIG. 25. The data is refreshed for every 5-track unit, and this procedure is repeated a number of times (m times) to record all I picture data with 5×m tracks.

The whole I picture data recorded by the above method can be obtained by scanning each of m 5-track units once to scan the 5×m tracks if the playback speed is up to the 5-fold speed.

With DVB (Digital Video Broadcasting) to be adopted in Europe, the bit rate of broadcasting signal of one program is variably settable at a desired value such as 20 Mbps, 10 Mbps or 4 Mbps. With digital VTRs, on the other hand, signals can be recorded at a bit rate of 25 Mbps. Accordingly, when the DVB signal (usual playback data), which is lower than 19.2 Mbps in bit rate, is recorded as it is; on a magnetic tape by the digital VTR, there occurs a signal absent region with an area corresponding to the reduction of the bit rate, hence a problem in efficient use of the tape.

Further according to the ATV method, a bit stream (image data 1V, aural data 1A and code data 1D) relating only to one program is broadcast over a period of time as shown in FIG. 20A, whereas with the DVB method, a bit stream (1V, 2V, 3V, 1A, . . . ) involving a plurality of programs, e.g., four programs, is broadcast as seen in FIG. 20B. Accordingly, if the DVB signal involving such programs is recorded by the digital VTR on a tape ailing the conventional method of FIG. 25 as it is, trick playback data as to different programs will be randomly present in the plurality of trick playback data areas to be arranged in the path to be traced by one head for trick playback. As a result, when one of the programs is to be reproduced by trick playback, there arises the problem that it is impossible to obtain all the trick playback data (I picture data) as to that program and to perform trick playback.

Further when it becomes no longer necessary to preserve the data as to one of the programs recorded on the tape, it is impossible to erase the data of the unnecessary program only and to record data of another program in the erased areas because the programs are randomly recorded on the tape. Thus, another problem is encountered in the efficient use of the tape.

SUMMARY OF THE INVENTION

An object of the present invention is to provide an image data recording method which assures efficient use of tapes even when usual playback data is lower in bit rate.

The present invention provides an image data recording method for use in recording image data on a tape by a signal recording head, wherein one or a plurality of tracks provide each of blocks, and a first area having usual playback data recorded therein and a second area having trick playback data recorded therein are formed on one track or each of the tracks included in each block, the first and second areas being arranged longitudinally of the track. As the usual playback data decreases in bit rate, the first area is diminised, and the second area is enlarged. More specifically stated, with a decrease in the bit rate of the usual playback data, the first area required for recording the usual playback data diminishes in corresponding relation with the decrease, so that the second area is enlarged by an amount corresponding to the diminution.

The data area for trick playback needs to be enlarged at a limited position permitting head tracing for trick playback, and the quantity of data is restricted, whereas the enlarged second area facilitates tracking control for the trick playback data area. Furthermore, the quality of image can be improved by increasing the quantity of trick playback data.

Stated specifically, the second area as formed when the usual playback data is maximum in bit rate serves as a basic area, and the second area is enlarged in a region which can be traced by the head for trick playback. In this case, the head tracing the basic area of the second area for trick playback moves past the increment area during tracing, whereby data is reproduced from both the basic area and the increment area.

More specifically, the second area can be enlarged in a region permitting facilitated tracking control for trick playback, or in a region having a high probability of ensuring reproduction of data by trick playback.

The same image data as in the basic area is to be recorded in the increment area. Even if the head becomes slightly displaced when tracing the basic area, the data can then be reliably reproduced from the increment area. The trick playback data comprises main data (I picture data) required for trick playback, and auxiliary data (for example, I picture data of different frame) contributing to an improvement in image quality. In the second area formed in a specified section of the tape, the main data is recorded in the basic area, and the auxiliary data is recorded in the increment area. Reproduction of the main and auxiliary data then results in an improved image quality.

The image data recording method embodying the invention assures facilitated tracking control or an improved image quality for efficient use of the tape even if the usual playback data is lower in bit rate.

Another object of the invention is to provide an image data recording method for use in recording image data as to a plurality of programs conjointly on a tape, the method assuring trouble-free trick playback.

Still another object of the invention is to provide an image data recording method which makes it possible to overwrite a specified program among a plurality of programs recorded on a tape.

The present invention provides a method of recording image data as to a plurality of programs on a tape conjointly by forming signal recording tracks on the tape and forming a usual playback data area and a trick playback data area on each of the tracks or on one track per plurality of tracks, the data areas being arranged longitudinally of the track, the image data recording method being characterized in that a number of tracks in accordance with the number of speed multiplication for trick playback provide each of trick playback frames, the same trick playback data being repeatedly recorded from track to track in the trick playback data areas of the tracks within the same trick playback frame, one or a number of trick playback frames providing each or blocks, the image data as to the plurality of programs being cyclically recorded in the respective blocks, each for one program.

According to the image data recording method described above, a number of tracks in accordance with the number of speed multiplication for trick playback provide one trick playback frame. For trick playback, the trick playback data is read from the trick playback data areas of these tracks by head tracing obliquely across the tracks. One or a number of such trick playback frames provide one block having recorded therein image data as to one program, so that when the block is traced with the head, all data required for producing trick playback picture for the program is retrieved.

All data required for producing trick playback picture for another program is obtained by tracing the next block with the head. The trick playback data as to all programs can be read by repeating this procedure.

For displaying trick playback images, head tracing for the desired program only is validated, and the trick playback data obtained by the head tracing is output to a display unit for trick playback.

Stated specifically, program data representing the name of program is added to the image data in each trick playback frame and recorded on the tape. At the time of image reproduction, the program data is decoded, whereby data as to a particular program is identified from among items of usual playback data or trick playback data retrieved from the tape.

Further stated specifically, while the image data as to the plurality of programs recorded on the tape is being reproduced in an overwriting mode, the trick playback frame for the specified one of the programs is located and overwritten to record image data as to another program. The image data as to the different programs is recorded in the block units, so that even if the image data as to the specified program is erased from the block concerned, the image data as to the other programs remains unaffected. Since a block of erased area thus occurs, the image data as to another program can be recorded in the block of erase area by overwriting.

Further stated specifically, the bit rate of the image data as to the above-mentioned another program to be recorded by overwriting is detected, and the specified program to be overwritten is selected based on the bit rate detected. In the case where the image data recorded on the tape has different bit rates for the respective programs, the program having the same bit rate as the image data as to another program to be recorded by overwriting is selected and overwritten, whereby the erased area can be used effectively.

According to the image data recording method embodying the invention, image data as to a plurality of programs is conjointly recorded on a tape, and the desired one of the programs can be reproduced free of trouble not only by usual playback but also by trick playback after the recording. Furthermore, specified one of the programs recorded on the tape can be overwritten by the method.

BRIEF DESCRIPTION OF THE DRAWINGS

FIG. 3 is a table showing the corresponding relationship between the order of priority and the added areas;

FIG. 20A and FIG. 20B are diagrams showing a bit stream of the ATV method and a bit stream of multiprogram broadcasting of the DVB method, respectively;

DETAILED DESCRIPTION OF EMBODIMENTS

With reference to the drawings, a detailed description will be given of first and second embodiments for recording data according to the DVB standards by a digital VTR according to the standards of the HD Digital VCR Conference.

First Embodiment (FIGS. 1–6)

Figure 4:
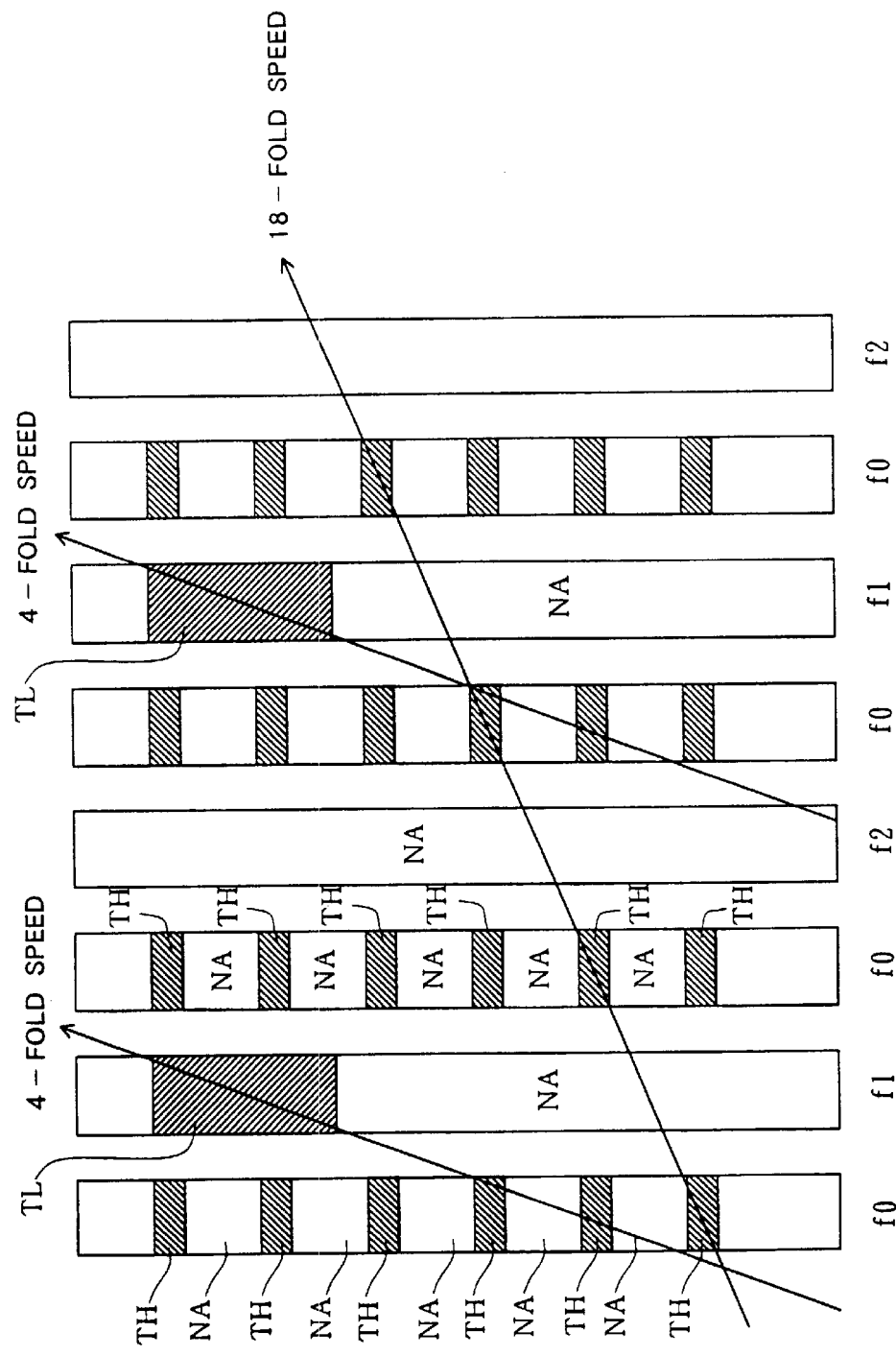
FIG. 4 is a diagram showing a signal recording pattern as a basis for the first embodiment.

FIG. 4 shows the structure of recording tracks providing a basis for the invention. Two opposed heads spaced apart by 180 deg are used for forming high-speed trick playback data areas TH for realizing trick playback by high-speed transport (e.g., playback at 18-fold speed) and low-speed trick playback data area TL for realizing trick playback by low-speed transport (e.g., playback at 4-fold speed), in image data areas each having 135 SB. The tracks are divided into f0 tracks, f1 tracks and f2 tracks according to the kind of the pilot signal for tracking. These tracks are repeatedly formed in the order of f0→f1→f0→f2 as illustrated.

More specifically, the high-speed trick playback data area TH is formed on the f0 track in each of six regions, i.e., SBs 40–44, SBs 62–66, SBs 84–88, SBs 106–110, SBs 128–132 and SBs 150–154. The low-speed trick playback data area TL is formed on the f1 track in the region of SBs 116–155. Other regions of the f0 and f1 tracks and the entire image data area of the f2 track are used as usual playback data areas NA.

Figure 26A:
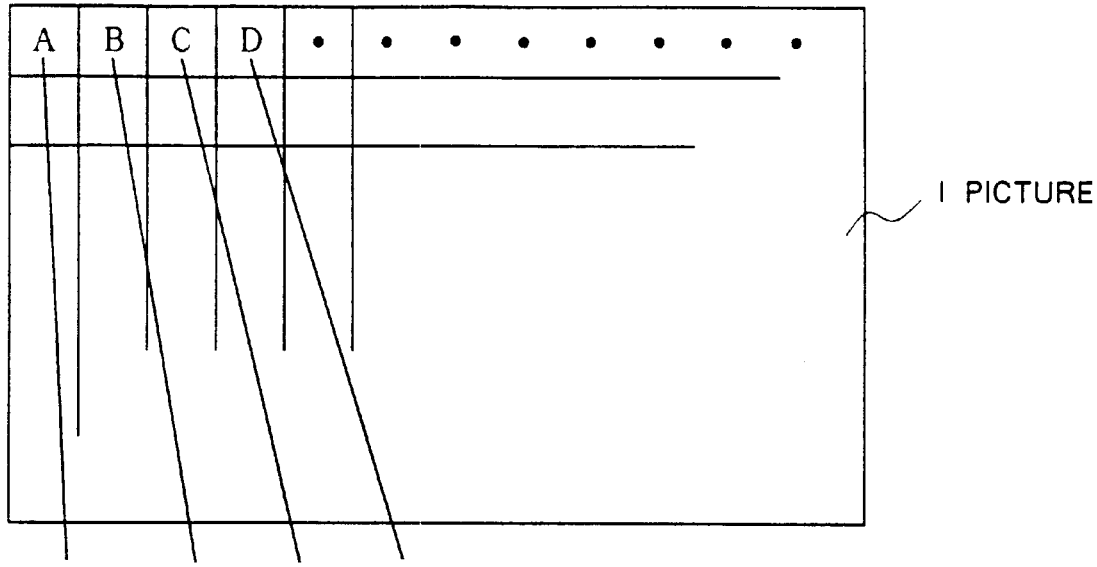
FIG. 26 is a diagram for illustrating a method of assigning trick playback data.
Figure 26B:
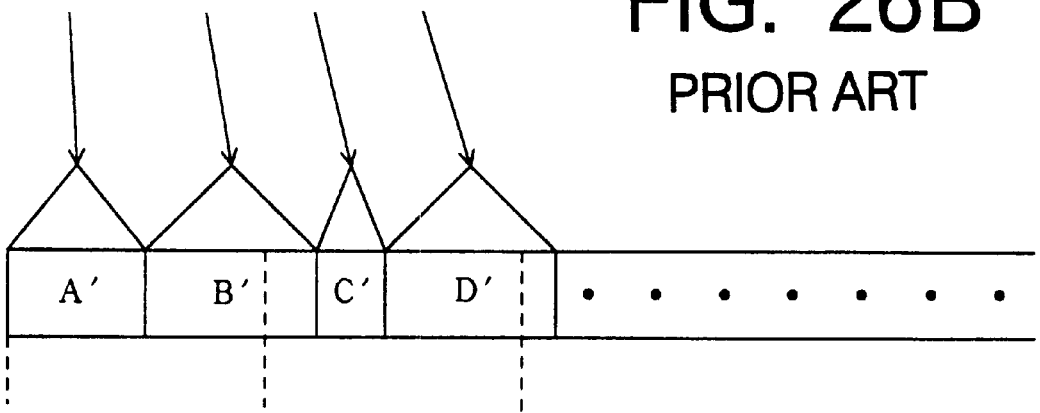
Figure 26C:
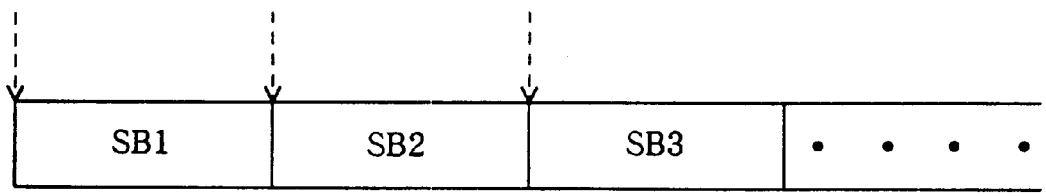

Trick playback data is assigned by the method shown in FIG. 26. First, I picture macroblocks A, B, C, . . . are extracted from an MPEG bit stream as shown in FIG. 26(a) to obtain a row of data A', B', C', . . . as seen in FIG. 26(b). The macroblocks as coded are different in code length. The data row A', B', C', . . . is then successively assigned to sync blocks SB 1, SB 2, SB 3, . . . as shown in FIG. 26(c).

The same trick playback data is recorded on tracks which are equal in number to the number of speed multiplication, n. For example, when n=4, four successive tracks are regarded as one unit, and the same data is recorded in the trick playback data areas within the same unit.

The data is refreshed in four-track units. This procedure is repeated a number of times (m times) to record all I picture image data with 4×m tracks.

All the I picture data recorded by the recording method described can be retrieved by scanning each of the m 5-track units once, i.e., the 4×m tracks, if the playback speed is up to 4-fold speed.

The present embodiment is adapted for use with DVB signals which are variable in bit rate. The low-speed trick playback data areas, TL shown in FIG. 4 serve as basic areas, and areas at additionally provided for recording low-speed trick playback data.

Figure 1:
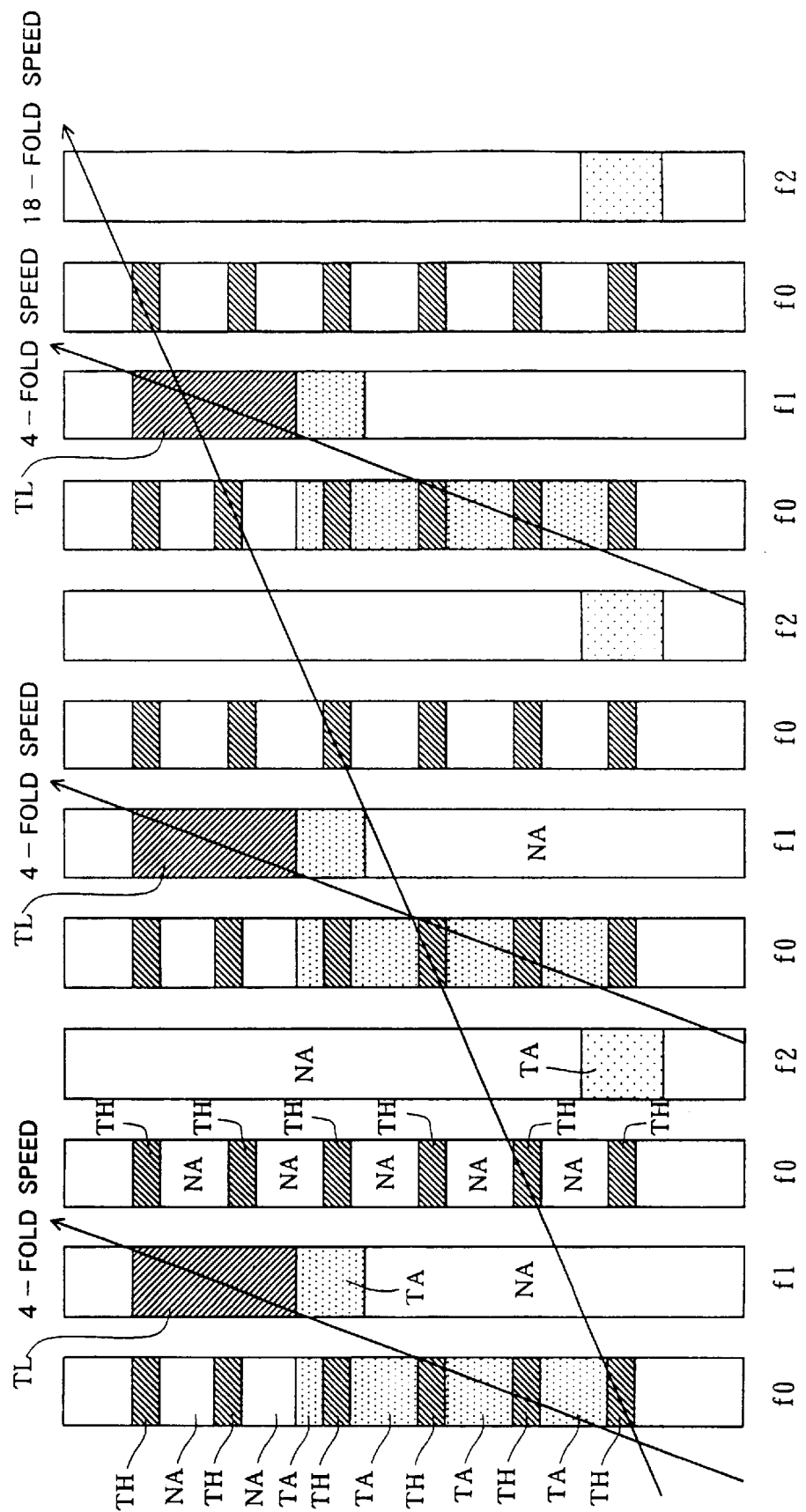
FIG. 1 is a diagram showing a signal recording pattern according to a first embodiment of image data recording method of the invention.

FIG. 1 shows areas which can be added in the case where 4-fold speed playback is realized by two opposed heads 180 deg apart. On the f0 track preceding the f1 track, low-speed trick playback data areas TA can be provided in four regions, i.e., SBs 45–61, SBs 67–83, SBs 89–105 and SBs 111–115. A low-speed trick playback data area TA can be added to the f1 track in the region of SBs 99–115. Such a data area TA can be added also to f2 track in the region of SBs 31–54.

Incidentally, the additional areas TA shown in FIG. 1 are determined by computer simulation as areas from which a signal can be reproduced by head tracing in the case where the effective trace percentage is 50%. The effective trace percentage of 50% indicates that when an area not smaller than 50% of the track width is traced by a magnetic head, the signal recorded in the area can be read.

In providing additional low-speed track playback data areas in accordance with a decrease in bit rate since the bit rate of the DVB signal is variable, the areas which can be added are given an order of priority according to the invention to indicate which area is to be provided in preference.

In view of the fact that the readable area diminishes with an increase in effective trace percentage from 50% to 60% and then to 70%, an area permitting reading even if the effective tracer percentage is high is given higher priority in determining the priority order.

Figure 2:
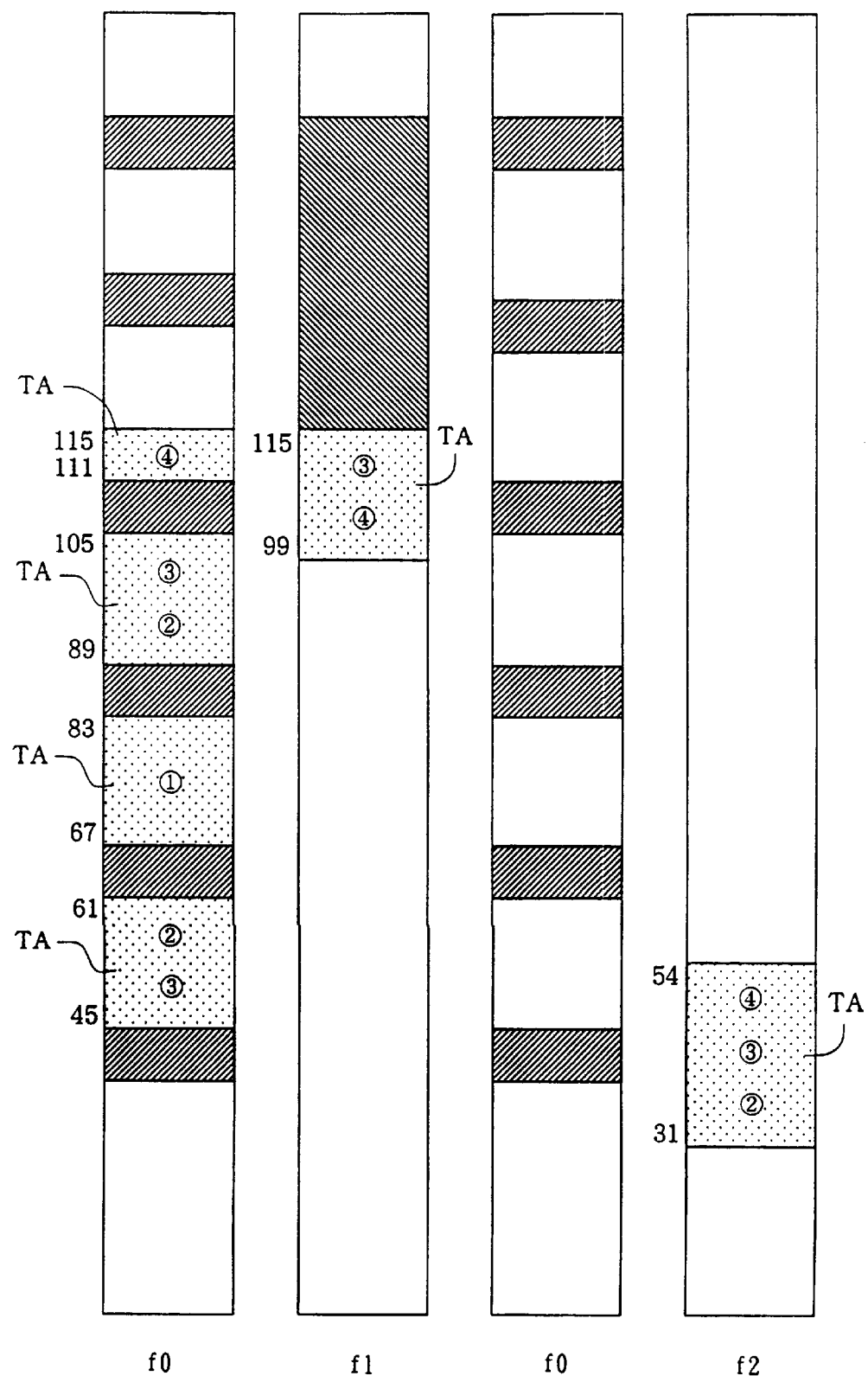
FIG. 2 is a diagram showing added areas in trick playback areas of tracks, the added areas being numbered in order of priority.

FIGS. 2 and 3 show the priority order (1) to (4) given to the additional areas TA. The following relationship is established between the bit rate of DVB signals and the additional areas (priority order).

| Bit rate | Additional area |
| --- | --- |
| 16.863–17.787 Mbps | (1) |
| 15.246–16.863 Mbps | (1), (2) |
| 14.553–15.246 Mbps | (1), (2), (3) |
| 9.600–14.553 Mbps | (1), (2), (3), (4) |

With reference to FIG. 1, the low-speed trick playback data area TL serving as a base area is provided on every four tracks, and the same data is recorded in the two data areas TL provided in a region of 8 tracks. The data is refreshed every eight tracks. This is repeated a plurality of times (m times) to record all I picture image data with 8×m tracks.

As to the data to be recorded in the additional area TA, the following two modes are changed over from one to the other. In a first trick playback mode, the same data as in the basic area TL is recorded in additional areas TA according to the order of priority. In this case, the quality of trick playback image remains unaltered, but tracking control can be effected with greater ease with an increase in the area of addition.

In a second trick playback mode, trick playback data of frame (I picture) different from the data in the basic area TL is recorded in additional areas TA according to the order of priority. In this case the above-mentioned value m can be smaller to result in a higher image refresh rate, giving trick playback images of higher quality.

Figure 5:
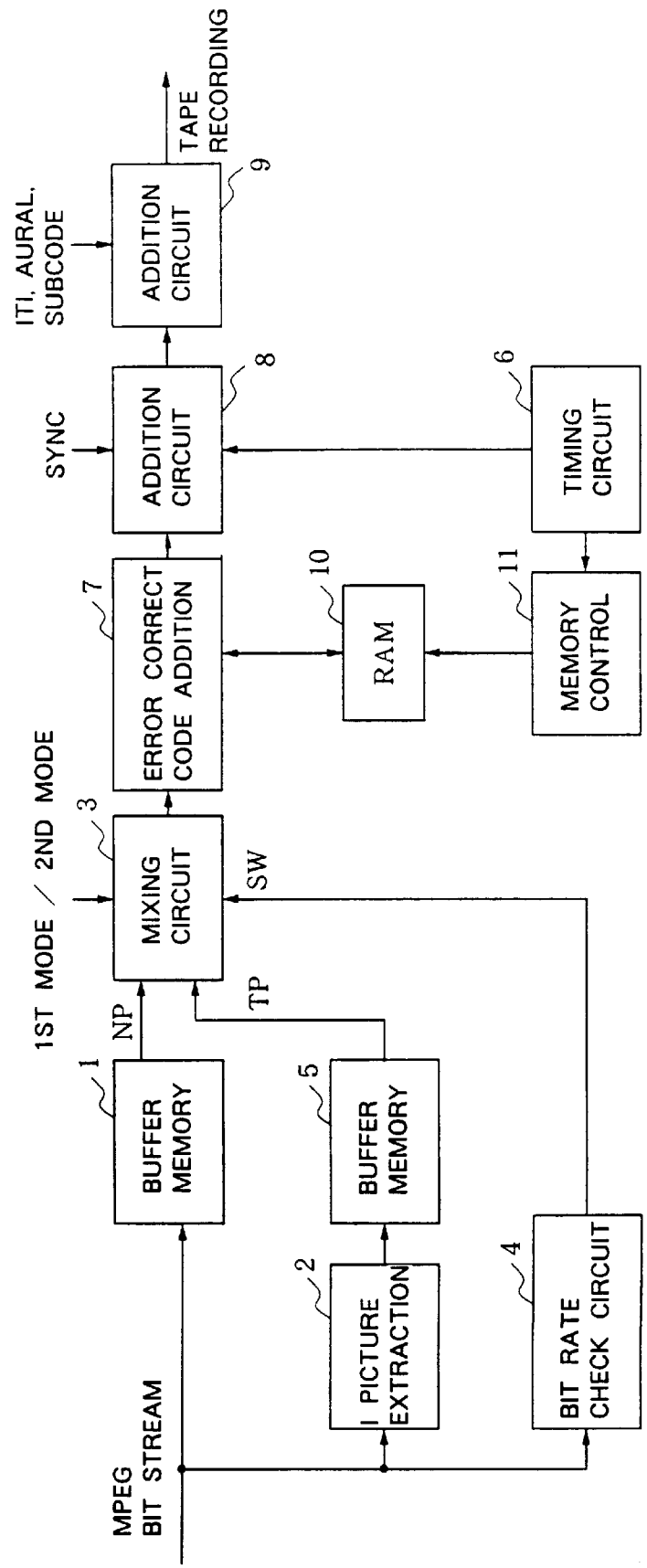
FIG. 5 is a block diagram showing the construction of a signal recording circuit.

FIG. 5 shows a signal recording circuit in the digital VTR for practicing the image data recording method of the invention. First an MPEG bit stream according to the DVB standards is input to a first buffer memory 1, I picture extraction circuit 2 and bit rate check circuit 4. The first buffer memory 1 processes the input signal to assign the bit stream to the usual playback data areas of sync blocks, obtains usual playback sync block data and feeds the data to a mixing circuit 3.

The I picture extraction circuit 2 extracts only I pictures from the input bit stream and feeds the pictures to a second buffer memory 5. The memory 5 performs signal processing for assigning the input data to the trick playback data areas of sync blocks, and feeds the resulting trick playback sync block data to the mixing circuit 3.

At the same time, the bit rate check circuit 4 checks the input bit stream for bit rate, and feeds the result to the mixing circuit 3, which has fed thereto a signal for selecting the first trick playback mode or the second trick playback mode.

According to the bit rate, the mixing circuit 3 determines the particular additional areas in the priority order to be provided, recognizes the data to be recorded in these additional areas in conformity with the mode select signal, and performs a switching operation for realizing the recording pattern of FIG. 1 in the priority order of FIG. 3. The data mixture of usual playback data and trick playback data thus obtained is fed to an error correct code addition circuit 7. When the input bit stream has added thereto a header indicating a maximum bit rate, the bit rate check circuit 4 can be replaced by a header decoding circuit.

Figure 23:
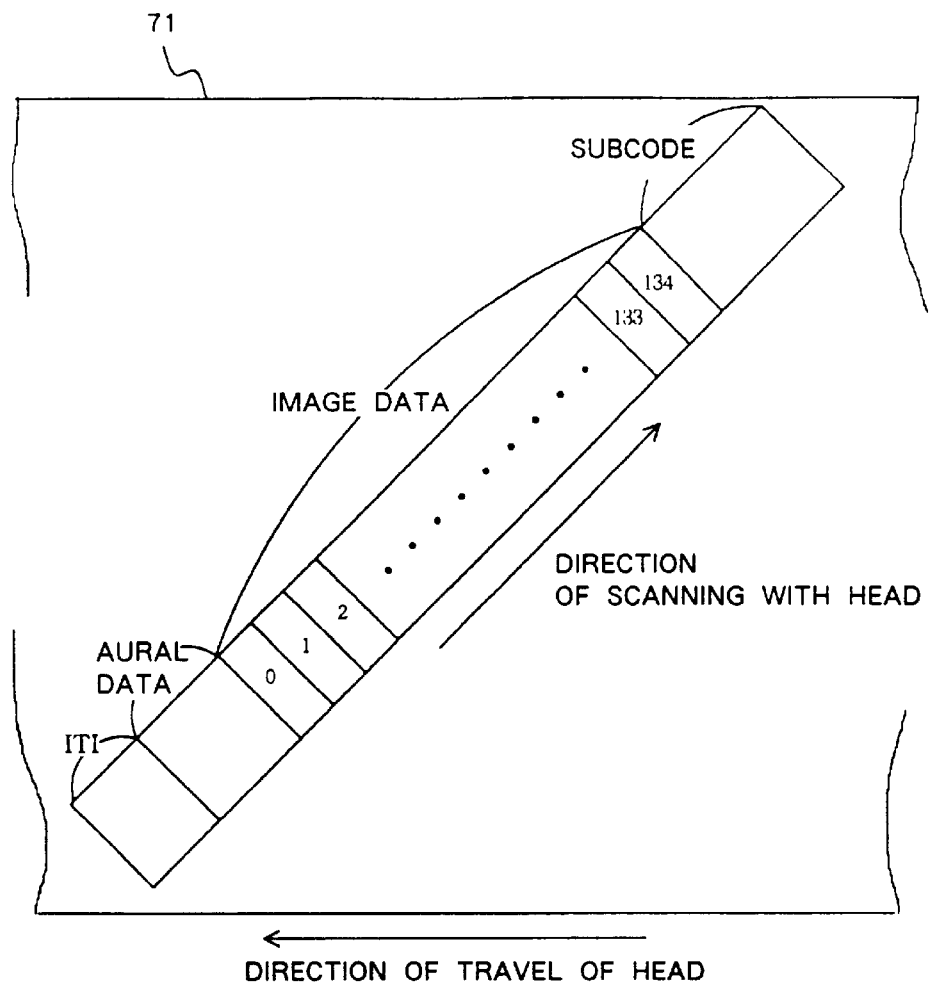
FIG. 23 is a diagram showing a signal recording format for digital VTRs.
Figure 24:
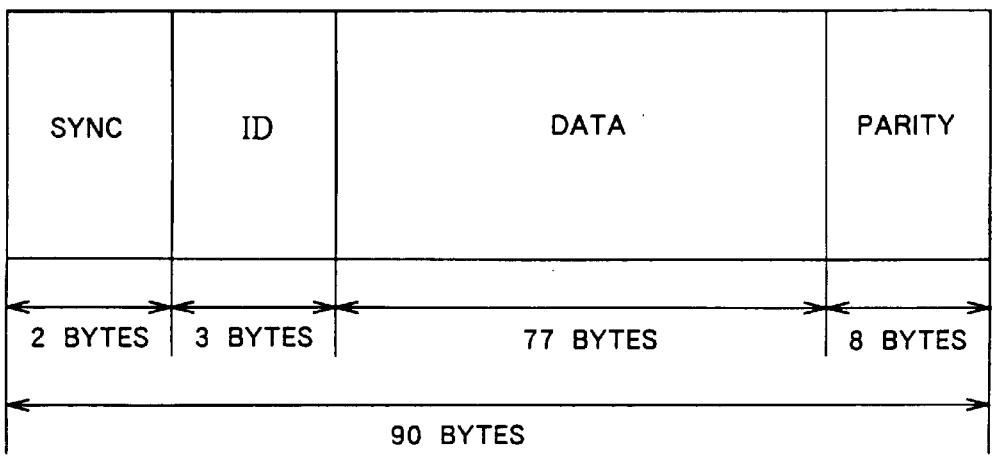
FIG. 24 is a diagram showing the data structure of a sync block for digital VTRs.
Figure 25:
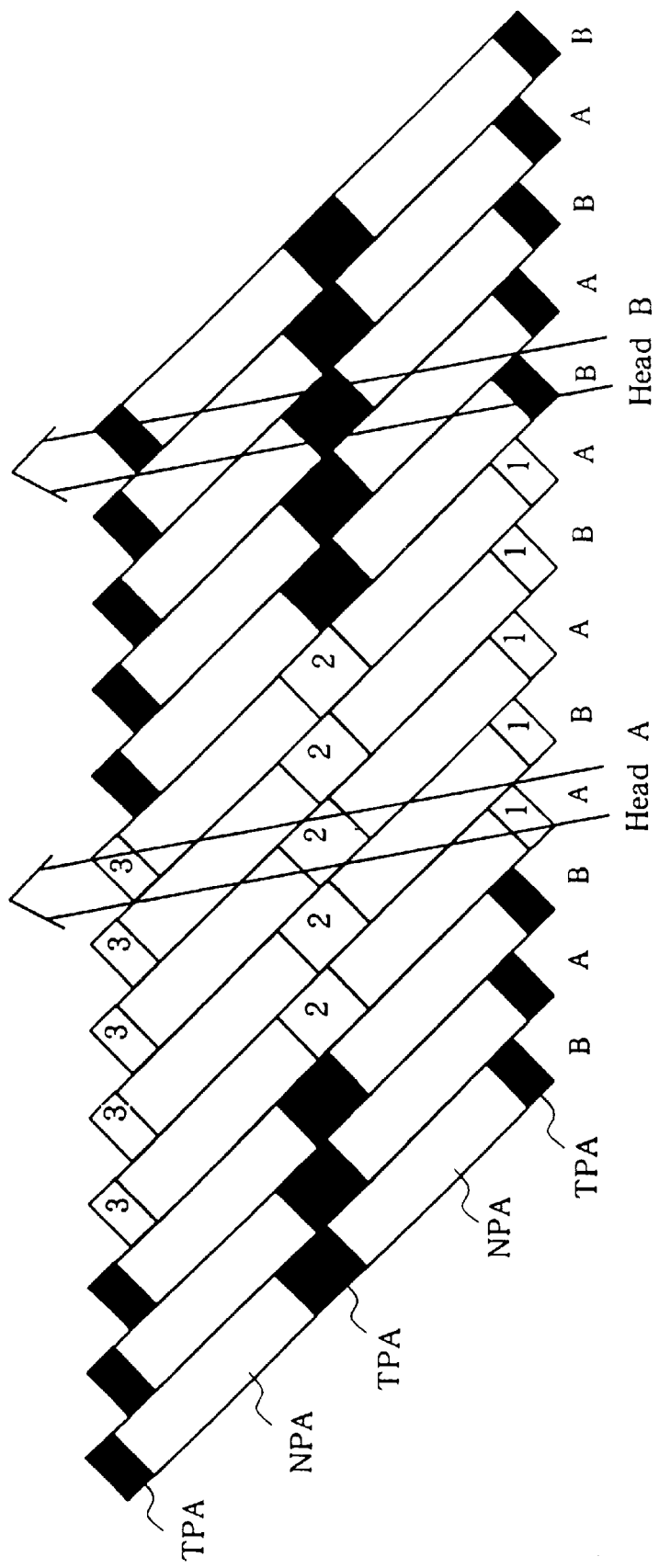
FIG. 25 is a diagram showing the signal recording pattern of a conventional image data recording method.

After error correct codes are added to the output of the mixing circuit 3 by the circuit 7, sync data and ID data are added to the output by a first data addition circuit 8. A second data addition circuit 9 subsequently adds ITI, aural data and subcode to the output, whereby data is completed in the specified format shown in FIGS. 23 and 24. The data is recorded by the magnetic heads on a tape. The error correct code addition circuit 7 has connected thereto a RAM 10 which is controllable by a memory control circuit 11. Error correct codes are retrieved from the RAM 10 and fed to the circuit 7.

A timing circuit 6 controls the operation timing of the addition circuit 8 and the memory control circuit 11.

Figure 6:
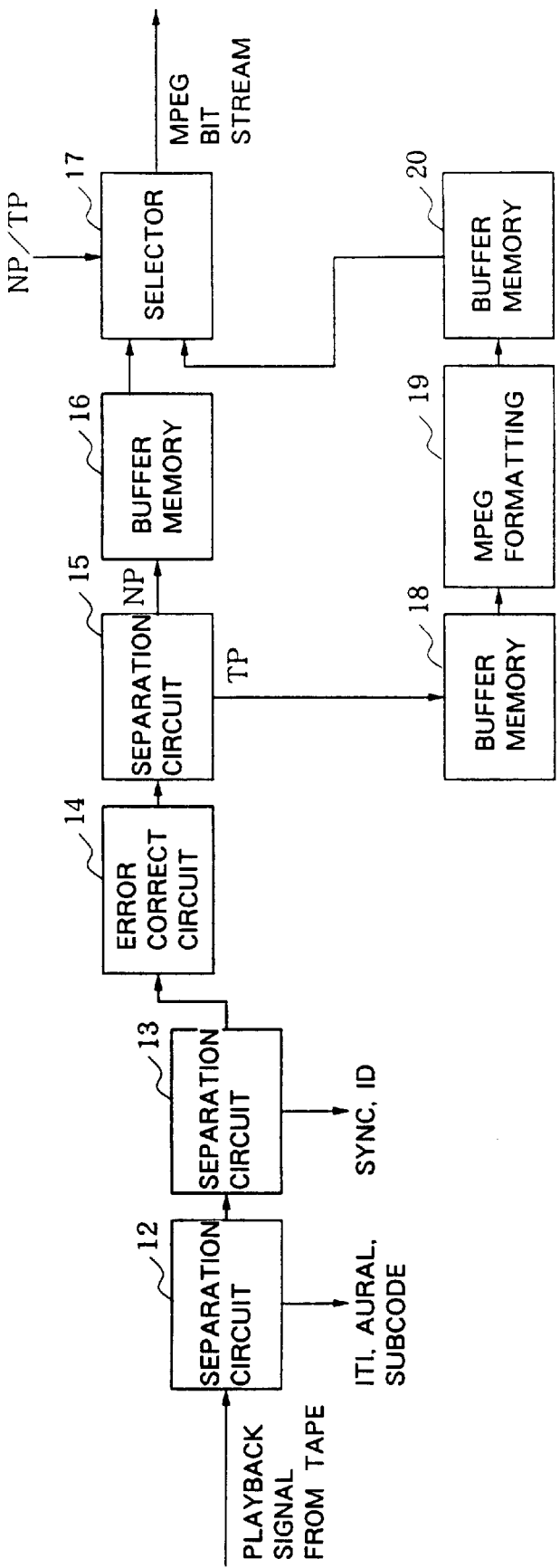
FIG. 6 is a block diagram showing the construction of a signal reproduction circuit.

FIG. 6 shows the construction of a signal reproduction circuit of the digital VTR. The signal reproduced from the tape by the magnetic heads is fed to a first separation circuit 12, where ITI, aural data and subcode are separated off. The sync data and ID data are subsequently separated off by a second separation circuit 13. The resulting image data is input to an error correct circuit 14, in which errors are corrected as already known. The corrected data is separated into usual playback data NP and trick playback data TP by a third separation circuit 15. The usual playback data NP is adapted to a constant rate by a first buffer memory 16 and then input to a selector 17.

On the other hand, the trick playback data TP is fed to an MPEG formatting circuit 19 via a second buffer memory 18. The formatting circuit 19 adds the layers above the macroblock layer to the trick playback data to form a bit stream which can be decoded by an MPEG decoder (not shown). The stream is sent to the next second buffer memory 20.

The bit stream is adjusted to a constant rate by the memory 20 and then fed to the selector 17, which selects the input data in accordance with a mode signal NP/TP for effecting a change-over to usual playback or trick playback. Consequently a usual playback image or trick playback image is displayed on the screen of a television receiver.

With the digital VTR described, when the bit rate of the original DVB signal (MPEG bit stream) to be recorded on the tape decreases, trick playback data areas are additionally provided in corresponding relation with the decrease. This results in facilitated tracking control, or an improved image quality due to an improvement in image refresh rate.

Second Embodiment (FIGS. 7–20)

Figure 8:
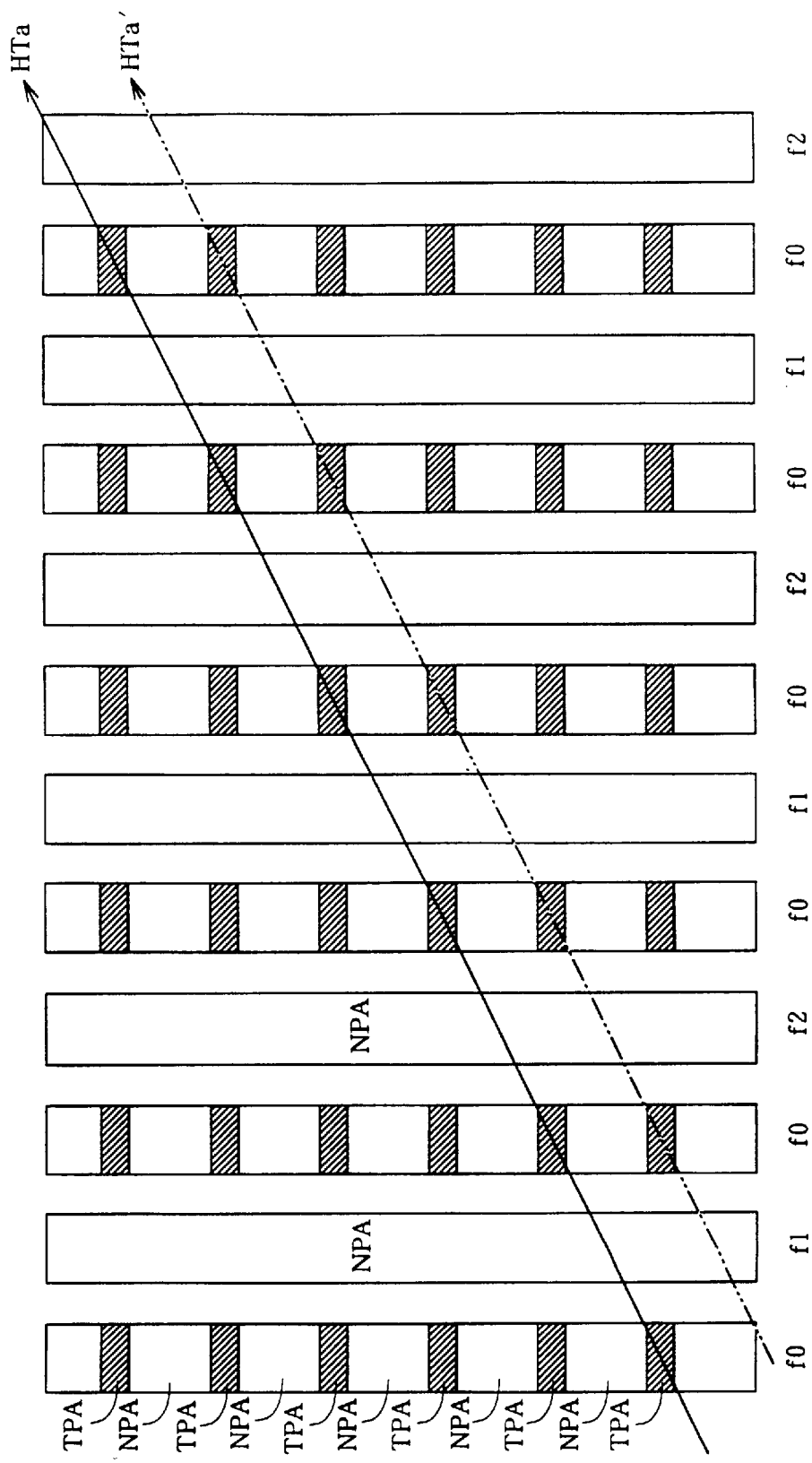
FIG. 8 is a diagram showing a track pattern of the second embodiment.

FIG. 8 shows a recording track structure providing a basis for the present invention. Two opposed heads 180 deg apart are used. The signal recording tracks to be formed by head tracing are divided into f0 tracks, f1 tracks and f2 tracks according to the type of the signal for difference in azimuth angle and for tracking. These tracks are repeatedly formed in the order of f0→f1→f0→f2 as illustrated. Trick playback data areas TPA for realizing high-speed trick playback are formed in the image data area of the f0 track having 135 SBs.

These trick playback data areas TPA are so positioned that data can be read therefrom when the tape is traced with the head is at a specified multiplied speed (e.g., 18-fold speed) as indicated by the arrow.

More specifically, the area TPA is provided in six regions on the f0 track, i.e., SBs 40–44, SBs 62–66, SBs 84–88, SBs 106–110, SBs 128–132 and SBs 150–154. The other regions of the f0 track and the f1 and f2 tracks are used as usual playback data areas NPA.

One trick playback area TPA is formed of 5SBs. The size of the area is determined in view of the fact that the area of 5 SBs efficiently accommodates two MPEG packets of188 bytes and has such a size that data can be normally read from the trick playback area by a single tracing movement of the heads for high-speed playback at about 18-fold speed.

The trick playback data areas are arranged on the azimuth tracks only at one side so that trick playback can be realized with tapes on which data is recorded in the single program mode to be described later, despite the construction of the opposed heads 180 deg apart, double azimuth heads or the like.

Next, image data recording-reproduction methods will be described in connection with a single program mode wherein only one program is recorded, and a multiprogram mode wherein a plurality of programs transmitted by multiprogram broadcasting are recorded.

(I) Recording in Single Program Mode

With reference to FIG. 8, when playback is realized, for example, at 18-fold speed, the same trick playback data (I picture data) is repeatedly recorded in the trick playback data areas of18 tracks from track to track.

The trick playback data area of 5 SBs is formed at 6 locations on one f0 track, so that the track has a data recording capacity of 5 SBs×6=30 SBs. Since 18 f0 tracks are formed every other track, it follows that data corresponding to 30 SBs is recorded using 36 tracks. These 36 tracks provide one trick playback frame (TP frame), and the data is refreshed every frame. The refreshment of data is repeated a plurality of times (m times) to record all image data of I picture with 36×m tracks. Since I pictures are not definite in the quantity of data, m is not limited to an integer.

For trick playback at 18-fold speed, the trick playback data is read from 6 trick playback data areas formed within one trick playback frame, by a single head trace HTa indicated by a solid arrow in FIG. 8, and m tracing movements provide all data of one I picture.

The broken-line arrow of FIG. 8 shows a head trace HTa' as displaced by 2 tracks. Although the last trick playback data area within the TP frame is not traced if tracing is performed as illustrated, the head trace on the preceding TP frame shifts to the following TP frame, with the result that data is read from the last data area.

Despite the shift in the phase of head trace, it therefore follows that a single tracing movement always affords all trick playback data within the TP frame since the data is repeatedly recorded in the frame of 36 tracks as shown in FIG. 8.

(II) Recording in Multiprogram Mode

Figure 7:
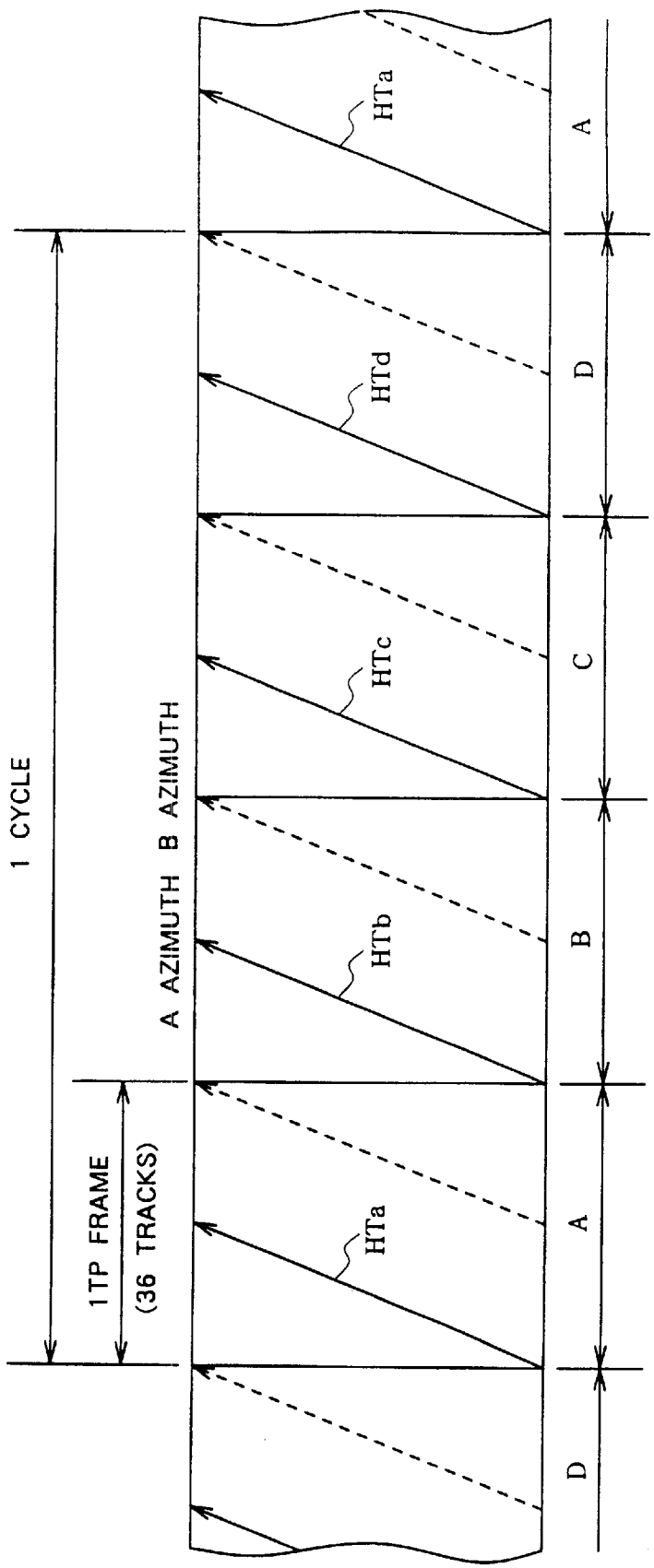
FIG. 7 is a diagram showing head traces and a track format according to a second embodiment of image data recording method of the invention.

For example, suppose a DVB signal sent forward conjointly contains 8 programs in the form of one bit stream, and desired four programs among the eight are to be recorded on a tape. To realize playback at 18-fold speed in this case, the TP frame described and comprising 36 tracks is used as a unit, and the same trick playback data is repeatedly recorded in the trick playback data areas from track to track within the same TP frame. The image data as to the four programs is successively written to respective TP frames following one after another. The image data as to the four programs is refreshed cyclically, the preparation of TP frames for the respective programs, one frame for each program, being one cycle as illustrated in FIG. 7.

For trick playback at 18-fold speed, the trick playback data is read from 6 trick playback data areas within one trick playback frame by a single head trace HTa indicated by the solid arrow in FIG. 8, and m tracing movements for each program provide all data of one I picture. To display the trick playback image of desired one of the four programs, e.g., of the program A, the data obtained by the head trace HTa for the program A only is used for display. The data obtained by the other lead traces TrHb, the, THd is discarded.

According to the foregoing method of recording in the multiprogram mode, the image data as to one program is written to TP frames independently of the other programs, so that after the image data as to the plurality of programs has been recorded on a tape, the image data as to a specified program only can be overwritten to record the image data as to a different program.

The digital VTR for practing the above method of recording image data has the recording circuits and playback circuits to be described below.

(A) Single Program Mode Recording Circuit

Figure 9:
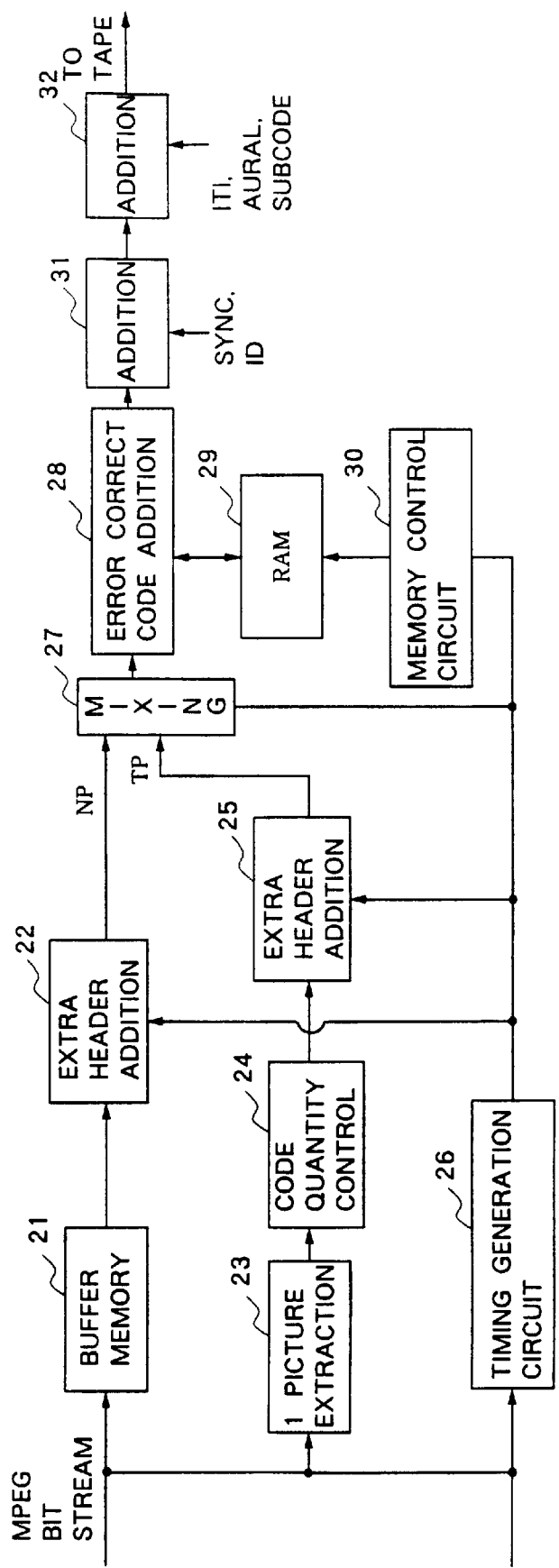
FIG. 9 is a block diagram showing a single program mode recording circuit.

With reference to FIG. 9, an MPEG bit stream based on the DVB standards is input to a buffer memory 21 and an I picture extraction circuit 23. The buffer memory 21 effects a data rate change for recording the MPEG bit stream in the usual playback data areas NPA of the track format shown in FIG. 8. For example, the input data is input at a rate of 15 Mbps, which is changed to a rate of25 Mbps.

The data with the changed rate is fed to a first extra header addition circuit 22, which adds to the data information indicating that it is usual playback data as will be described later, and then fed to a mixing circuit 27.

On the other hand, the I picture extraction circuit 23 extracts only I pictures from the input bit stream, and the I picture data is fed to a code quantity control circuit 24, which controls the code quantity of the data so as to assign the data to the trick playback data areas TPA of the track format shown in FIG. 8.

For example, in the case of playback at 18-fold speed, the data capacity C of the trick playback data areas within one TP frame is calculated from the following equation.

$$C = 30\ SBs \times (77\ bytes/SB) \times (8\ bits/byte)$$
$$= 147840\ bits$$

Accordingly, the playback bit rate R in this case is calculated from the equation given below.

$$R = 147840\ bits \times 18 \times 36\ tracks/(300\ tracks/sec)$$
$$= 320\ Kbps$$

The control circuit 24 of FIG. 9 controls the code quantity so that images can be reproduced normally at the playback bit rate R. For example when one image is to be produced per second on the average, the code quantity of assignable trick playback data is 320 Kb.

The data obtained from the control circuit 24 is fed to a second extra header addition circuit 25, given information to be described below and indicating that it is trick playback data, and input to the mixing circuit 27. The usual playback data NP from the circuit 22 and the trick playback data TP from the circuit 25 are mixed together by the circuit 27 so as to realize the track pattern of FIG. 8.

The data mixture from the mixing circuit 27 is given error correct codes by an error correct code addition circuit 28 and thereafter given sync data and ID data by a first data addition circuit 31. The subsequent second data addition circuit 32 further adds ITI, aural data and subcode to afford data in the specified format. The data is sent through a modulation circuit 88 and a recording amplifier 89 and recorded on a magnetic tape 71 by magnetic heads 70. The error correct code addition circuit 28 has connected thereto a RAM 29 controllable by a memory control circuit 30. Error correct codes are retrieved from the RAM 29 and fed to the circuit 28.

Figure 10:
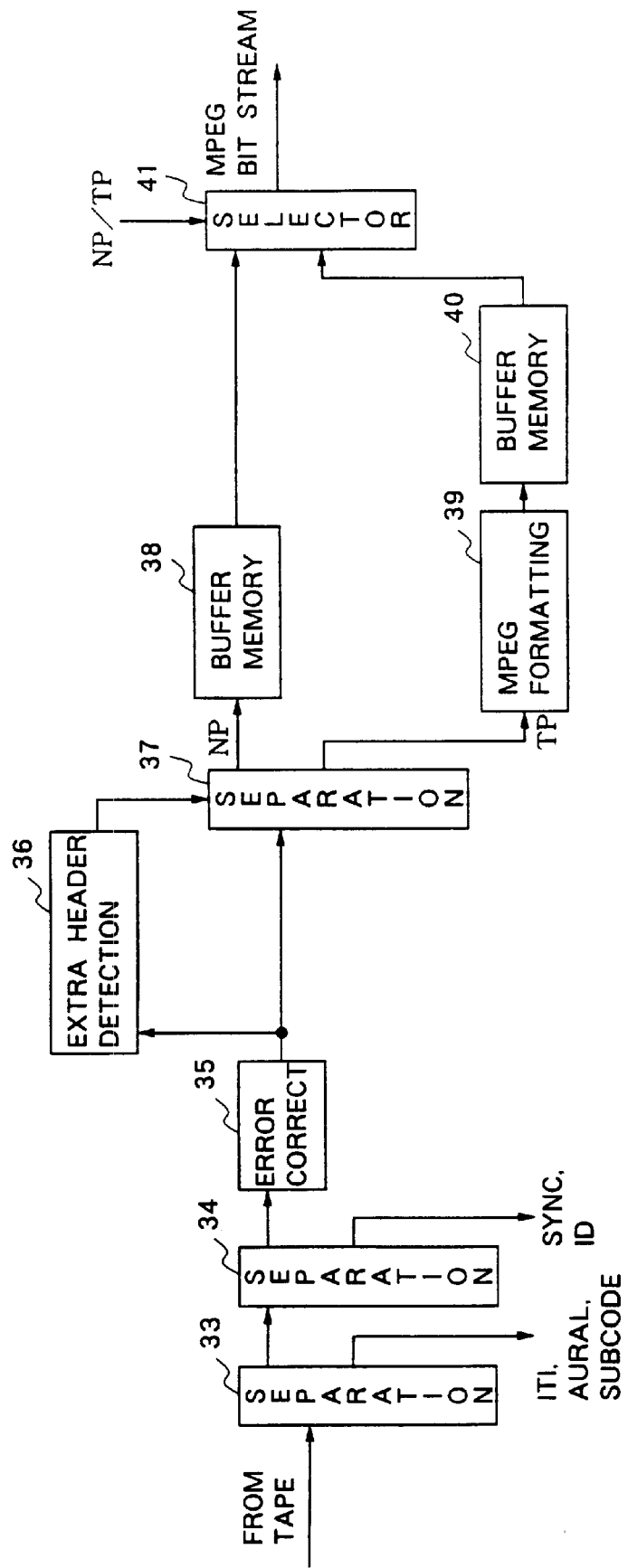
FIG. 10 is a block diagram showing a single program mode playback circuit.

A timing generation circuit 26 to which the MPEG bit stream is input controls the operation timing of the first and second extra header addition circuits 22, 25, mixing circuit 27 and memory control circuit 30. (B) Single program mode playback circuit As shown in FIG. 10, the signal reproduced from the tape by the head is fed to a first data separation circuit 33, where ITI, aural data and subcode are separated off. The sync data and ID data are separated off by the next second data separation circuit 34. The resulting image data is input to an error correct circuit 35, in which errors are corrected in the known manner. The corrected data is delivered to an extra header detection circuit 36 and at the same time input to a data separation circuit 37.

For usual playback, the circuit 36 detects the extra header attached to the input data, and checks the input data as to whether it is usual playback data based on the detection. In conformity with the check result, the separation circuit 37 separates off the usual playback data NP only, which is adjusted to a constant rate by a first buffer memory 38 and thereafter input to a selector 41.

For trick playback, on the other hand, the input data is checked as to whether it is trick playback data based on the result of detection by the circuit 36. In conformity with the check result, the circuit 37 separates off trick playback data TP only. The data is fed to an MPEG formatting circuit 39, in which the layers above the macroblock layer are added to the data TP to form a bit stream which is decodable by an MPEG decoder (not shown). The stream is sent to the subsequent second buffer memory 40.

The bit stream is adjusted to a constant rate by the memory 40 and thereafter fed to the selector 41. The selector selects the input data according to a mode signal NP/TP for a change-over to usual playback or to trick playback, and the data is delivered as an MPEG bit stream to the television receiver. Consequently, the screen of the receiver displays usual playback images or trick playback images.

(C) Multiprogram Mode Recording Circuit

Since the recording rate of the digital VTR is 25 Mbps, four programs sent forward at a transmission rate of 6.25 Mbps can be recorded if no trick playback data areas are provided, whereas about 4.8 Mbps is the upper limit in the case where trick playback areas are formed as seen in FIG. 8. It is assumed that four programs forwarded at a transmission rate of about 4 Mbps are recorded according to the present embodiment. Although two programs can be simultaneously recorded with DVB signals having a transmission rate of 4.8 to 9.6 Mbps, only one program is recordable with DVB signals having a transmission rate of 9.6 Mbps or higher.

Figure 11:
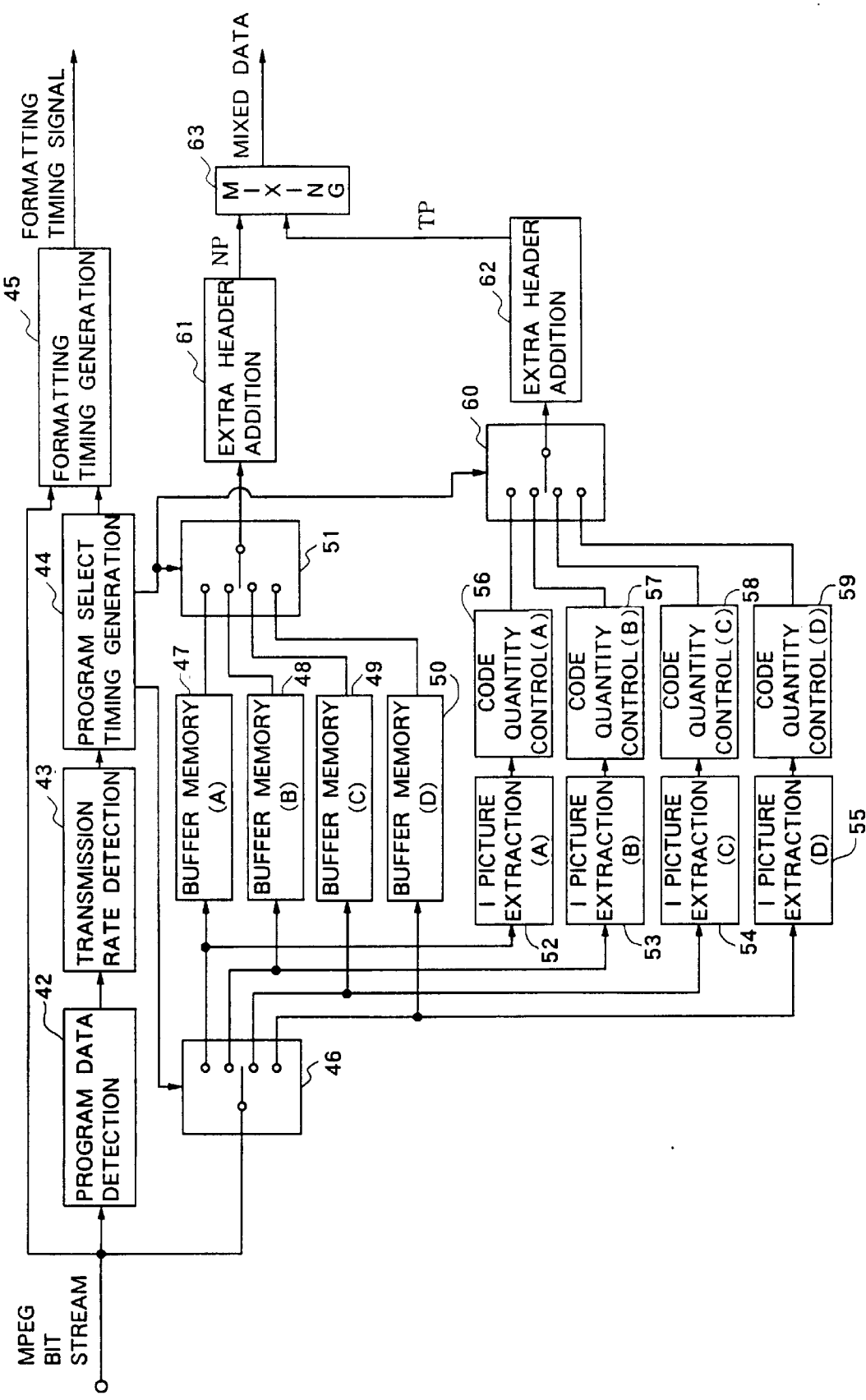
FIG. 11 is a block diagram showing the front stage of a multiprogram mode recording circuit.

With reference to FIG. 11, a signal processing system for preparing usual playback data NP from an MPEG bit stream has four buffer memories 47 to 50 arranged in parallel and corresponding to the desired four programs A, B, C, D, respectively. A signal processing system for preparing trick playback data TP from the MPEG bit stream has four I picture extraction circuits 52 to 55 corresponding to the four programs A, B, C, D, respectively,and arranged in parallel, and four code quantity control circuits 56 to 59 arranged in parallel subsequent to the circuits 52 to 55.

The MPEG bit stream is divided by a distribution circuit 46 for the respective programs, and the separated items of data for the respective programs are fed to the buffer memories 47 to 50 in corresponding relation and also to the corresponding I picture extraction circuits 52 to 55 at the same time. The buffer memories 47 to 50 change the data rate to record the MPEG stream in the usual playback data areas NPA shown in FIG. 8. The data having a changed rate and obtained from the memories 47 to 50 is fed to the input terminals of a first selector 51 for the selection of data as to desired one program. The selected data is fed to a first extra header addition circuit 61, given the information to be described below and indicating that the data is usual playback data, and then input to a mixing circuit 63.

In the I picture extraction circuits 52 to 55, on the other hand, I pictures only are extracted from the input bit stream, and the I picture data as to each of the programs is fed to the corresponding one of the subsequent code quantity control circuits 56 to 59. The control circuit controls the code quantity of the data so as to assign the data to the trick playback data areas TPA of the track format shown in FIG. 8. In the case where one image is produced per second on the average by trick playback at 18-fold speed from the data recorded in the foregoing single program mode, the code quantity of the assignable trick playback data is 320 Kb, whereas in recording four programs in the multiprogram mode, the code quantity of the assignable trick playback data is 80 Kb. For example, one image per 4 seconds is to be produced on the average in this case.

However, the number of images to be produced per unit time, i.e., the image refresh rate, is in a trade-off relationship with the quantity of I picture data to be recorded. The quantity of I picture data may be decreased to attain a higher image refresh rate, for example, by reconstructing I pictures only with direct current component.

The data obtained from the code quantity control circuits 56 to 59 is fed to the input terminals of a second selector 60, by which the data as to the desired one program is selected. The selected data is fed to a second extra header addition circuit 62, by which the information to be described later and indicating that the data is trick playback data is attached to the input data. The data is then delivered to the mixing circuit 63.

The usual playback data NP from the first extra header addition circuit 61 and the trick playback data from the second extra header addition circuit 62 are mixed together by the circuit 63, and the data mixture is output to the subsequent circuit.

The MPEG bit stream is also fed to a program select timing generation circuit 44 via a program data detection circuit 42 and a transmission rate detection circuit 43.

The program data detection circuit 42 detects information as to the program to be recorded, and the transission rate detection circuit 43 detects the transmission rate of each program. The timing generation circuit 44 prepares a program select timing signal for the change-over control of the distribution circuit 46, first selector 51 and second selector 60 based on the program information and transmission rate detected so as to record data in the sequence shown in FIG. 7.

The MPEG bit stream and the timing signal prepared by the circuit 44 are fed to a format timing generation circuit 45 to prepare a timing signal for the format according to the DVB standard. The signal is output to the subsequent circuit.

Figure 12:
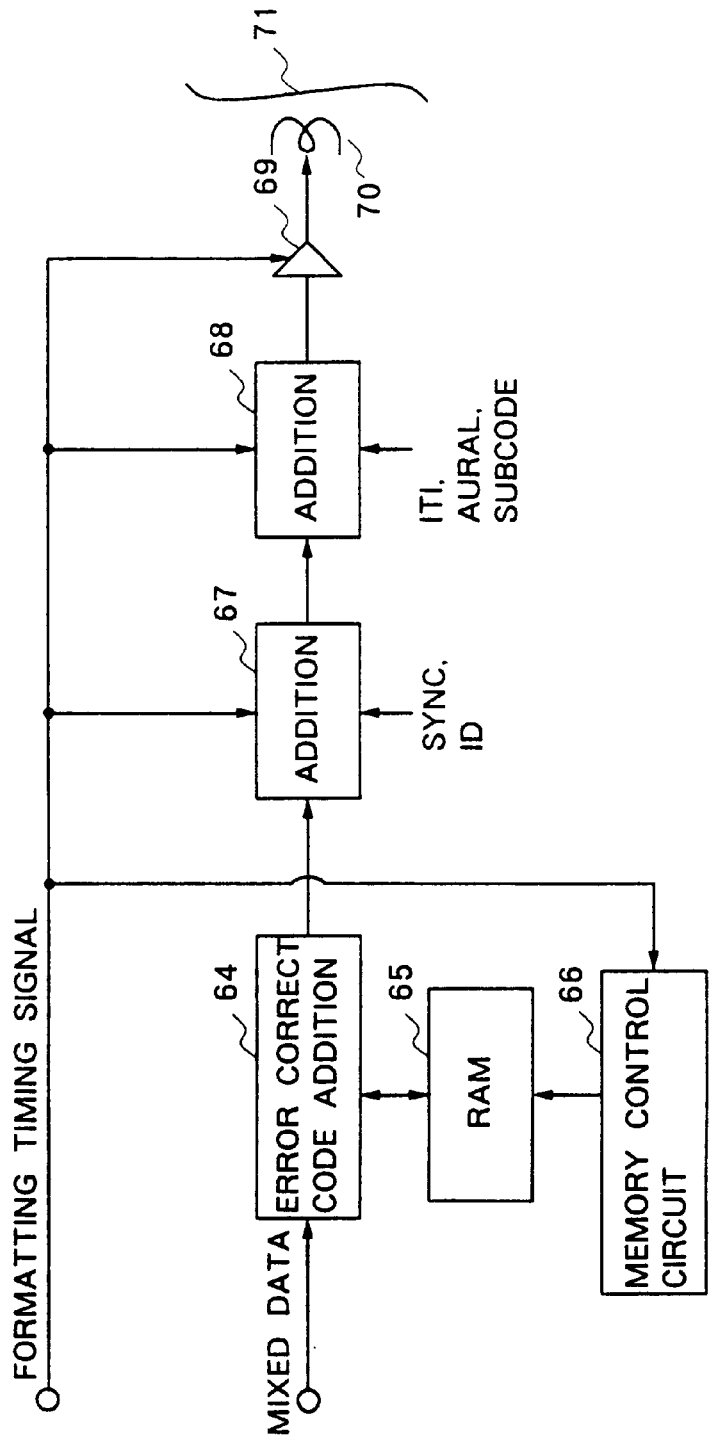
FIG. 12 is a block diagram showing the rear stage of the same circuit.

With reference to FIG. 12, the data mixture from the mixing circuit 63 is given error correct codes by an error correct code addition circuit 64 and then fed to a first data addition circuit 67, in which sync data and ID data are attached. ITI, aural data and subcode are further added to the resulting data by the subsequent second data addition circuit 68 to provide data in the specified format. The data is fed to the recording heads 70 via a recording amplifier 69 and recorded on a magnetic tape 71.

The error correct code addition circuit 64 has connected thereto a RAM 65 controllable by a memory control circuit 66. Error correct codes are retrieved from the RAM 65 and fed to the addition circuit 64.

The memory control circuit 66, first data addition circuit 67, second data addition circuit 68 and recording amplifier 69 have their operation controlled by a timing signal obtained from the format timing generation circuit 45. Consequently, the image data as to the programs is recorded in the format shown in FIG. 7.

While four programs forwarded at a transmission rate of about 4 Mbps are recorded in the present case, two programs having a transmission rate of 4.8 to 9.6 Mbps or one program having a transmission rate of at least 9.6 Mbps can also be recorded through the same operation as described above. However, buffer memories, I picture extraction circuits and code quantity control circuits shown in FIG. 11 and unnecessary owing to a reduction in the number of programs are held out of data processing operation.

(D) Multiprogram Mode Overwrite Recording Circuit

Figure 13:
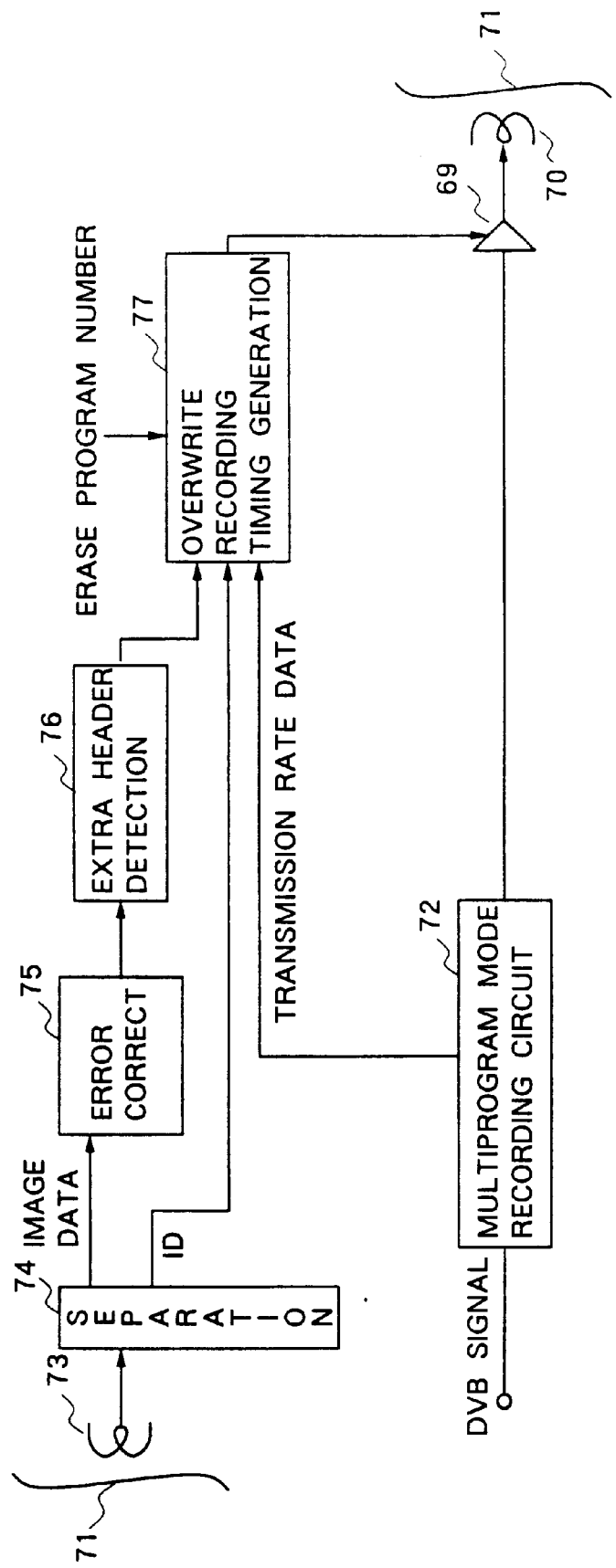
FIG. 13 is a block diagram showing a multi-program mode overwrite recording circuit.

Of the four programs recorded on the magnetic tape by the foregoing multiprogram mode recording circuit, one of the programs may become unnecessary. FIG. 13 shows an overwrite recording circuit for use in overwriting that particular program for recording another program. In this case, while reproducing the plurality of programs recorded on the magnetic tape 71, the recording areas of the specified program to be erased are recognized, and the image data as to another program is written to the recording areas at the same time.

With reference to FIG. 13, the data read from the magnetic tape 71 by a playback head 73 is fed to a data separation circuit 74, where the image data and ID data are separated off. The image data has its errors corrected in the known manner by an error correct circuit 75 and then sent to an extra header detection circuit 76, which detects the extra header to be described below and containing information as to programs, whereby the programs recorded on the tape 71 are recognized. The result is fed to an overwrite recording timing generation circuit 77 along with the ID data.

The tranmission rate data obtained from the transmission rate detection circuit 43 of the multi-program mode recording circuit 72 shown in FIGS. 11 and 12 is also fed to the circuit 77.

In accordance with the input data and based on the program number to be erased and manually specified by the user for the timing generation circuit 77, the circuit 77 detects the areas recording the program to be erased, from among the four programs recorded on the tape 71, and on-off controls the recording amplifier 69 with reference to the result of detection. Consequently, the data of specified format obtained from the multiprogram mode recording circuit 72 is recorded by overwriting the recording areas on the tape 71.

The recording head 70 and the playback head 73 can be replaced by a recording/playback head. The head is then made to serve as a playback head when tracing the area recording the program not to be erased, and to serve as a recording head when tracing the area recording the program to be overwritten. It is possible to detect the bit rate of the image data as to another program to be recorded by overwriting, and to automatically select the program to be overwritten based on the detected bit rate.

(E) Multiprogram Mode Playback Circuit

Figure 14:
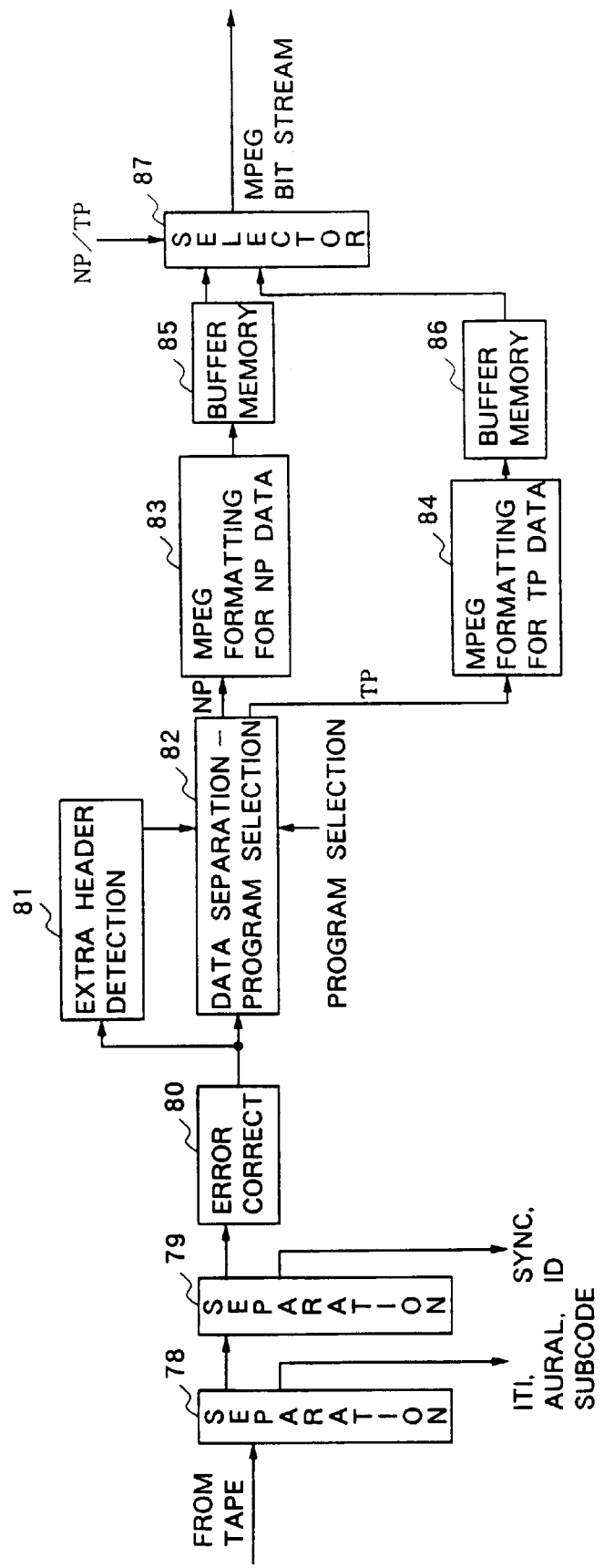
FIG. 14 is a block diagram showing a multi-program mode playback circuit.

With reference to FIG. 14, the signal reproduced from the tape by the magnetic head is fed to a first data separation circuit 78, where ITI, aural data and subcode are separated off. The sync data and ID data are separated off by the subsequent second data separation circuit 79. The resulting image data is input to an error correct circuit 80, in which errors are corrected in the known manner. The corrected data is delivered to an extra header detection circuit 81 and input to a data separation-program selection circuit 82 at the same time.

For usual playback, the circuit 81 detects the extra header attached to the input data, and checks the input data as to whether it is usual playback data based on the detection. In accordance with the check result and with a program select signal input by the user, the data separation-program selection circuit 82 separates off the usual playback data NP only of a specified program. An NP data MPECG formatting circuit 83 adds the layers above the macroblock layer to the data NP, forming a bit stream which is decodable by an MPEG decoder (not shown). The bit stream is sent to a first buffer memory 85, adjusted to a constant rate and fed to a selector 87.

For trick playback, on the other hand, the input data is checked as to whether it is trick playback data based on the result of detection by the circuit 81. In accordance with the check result and with the program select signal input by the user, the data separation-program selection circuit 82 separates off only the trick playback data TP of the specified program. A TP data MPEG formatting circuit 84 adds the layers above the macroblock layer to the data TP to form a bit stream which is decodable by an MPEG decoder (not shown). The bit stream is sent to a second buffer memory 86, adjusted to a constant rate and fed to the selector 87.

The selector 87 selects the input data according to a mode signal NP/TP for a change-over to usual playback or to trick playback, and the data is delivered as an MPEG bit stream to the television receiver. As a result, the screen of the receiver displays usual playback images or trick playback images.

(F) Method of Controlling Tape Transport Speed

Next, a method will be described of efficiently using magnetic tapes by setting the tape transport speed variably on a VTR in accordance with the bit rate of the DVB signal to be recorded on the tape.

According to the DVB method, the bit rate of the broadcasting signal of one program is set variably over the range of 15 to 20 Mbps as previously described, whereas digital VTRs are adapted to record signals at a bit rate of 25 Mbps. Therefore, when the DVB signal (usual playback data), which is lower than 19.2 Mbps in bit rate, is recorded as it is on the magnetic tape by the digital VTR, there occurs a signal absent region with an area corresponding the decrease in the bit rate, so that a problem is encountered ill using the tape efficiently.

Figure 15:
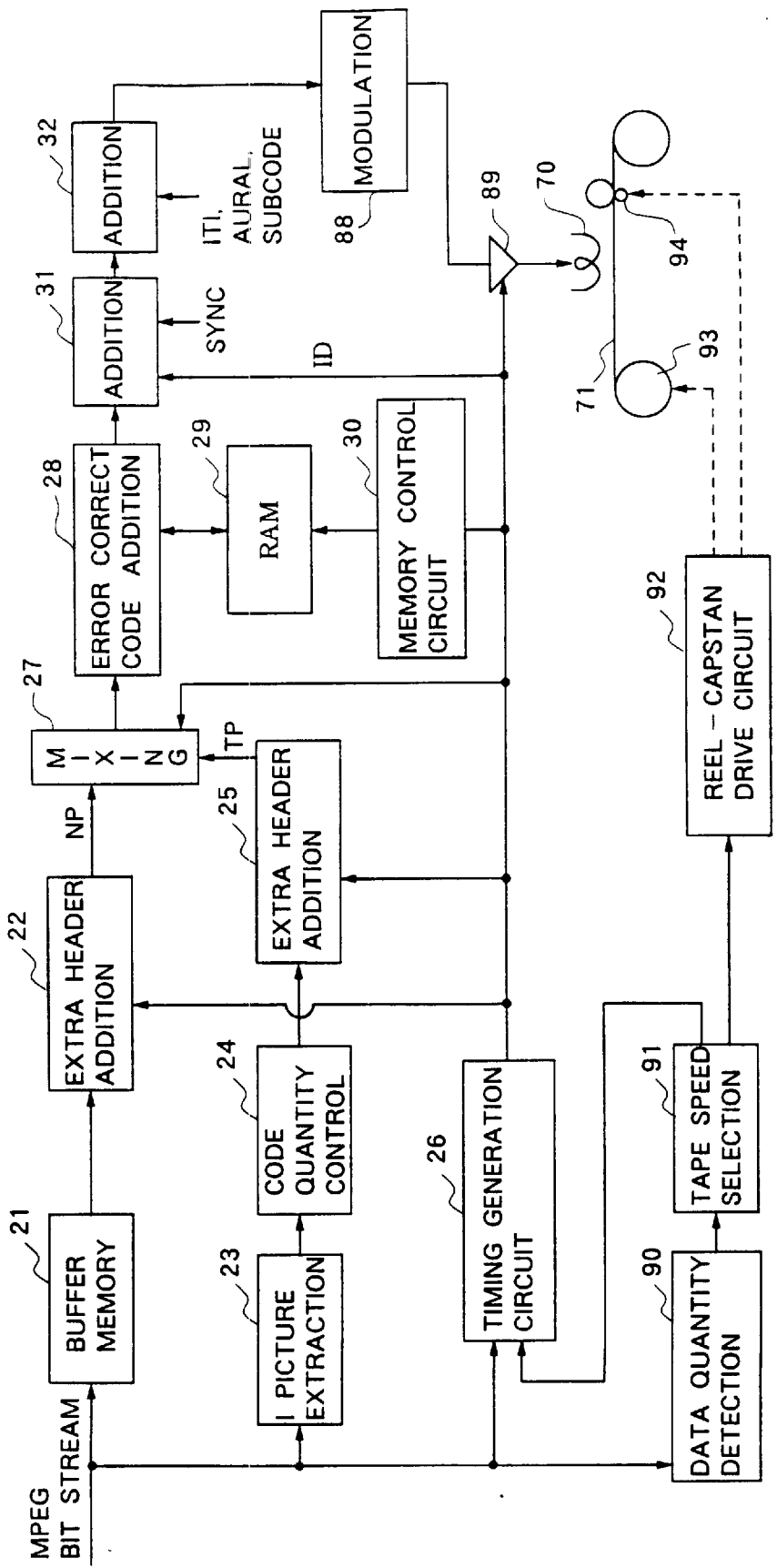
FIG. 15 is a block diagram showing a recording circuit of the tape transport speed control type.
Figure 16:
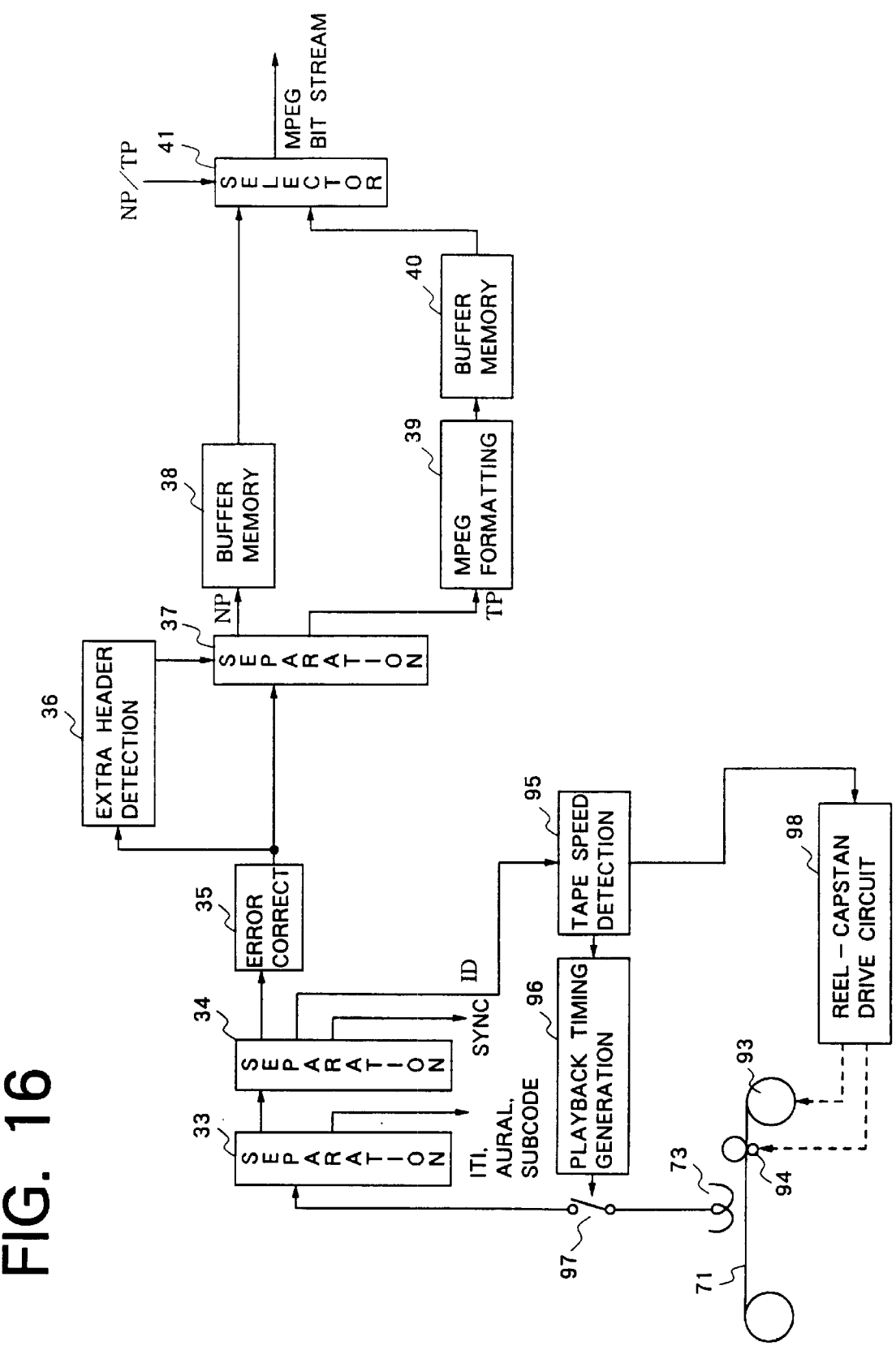
FIG. 16 is a block diagram showing a playback circuit of the tape transport speed control type.

FIGS. 15 and 16 show a recording circuit and a playback circuit for use in the present embodiment. These circuits have components in common with the single program mode recording circuit and playback circuit shown in FIGS. 9 and 10. Throughout the drawings concerned, such like components are designated by like reference numerals and will not be described repeatedly.

With reference to the recording circuit of FIG. 15, the MPEG bit stream has its data quantity per unit time detected by a data quantity detection circuit 90, and the resulting detection signal is fed to a tape speed selection circuit 91, which selects one of three predetermined modes relating to the tape speed. With the present embodiment, these modes are standard tape speed (standard speed mode), ½ of the standard tape speed (½ speed mode) and ¼ of the standard tape speed (¼ speed mode). In any of these modes, it is desired from the viewpoint of the circuit construction that recording be made so as to give the tape an approximately uniform signal recording density per unit area thereof (area recording density). Accordingly, if a bit stream of up to 19.2 Mbps can be recorded in the standard speed mode, a bit stream of up to 9.6 Mbps is to be recorded in the ½ speed mode, and that of up to 4.8 Mbps is to be recorded in the ¼ speed mode.

Thus, the standard speed mode is selected when the data quantity of the MPEG bit stream detected by the detection circuit 90 is up to 19.2 Mbps, the ½ speed mode is selected when the quantity is up to 9.6 Mbps, and the ¼ speed mode when it is up to 4.8 Mbps. A signal indicating the tape speed mode thus selected is sent from the tape speed selection circuit 91 to a reel-capstan drive circuit 92, whereby a reel 93 and capstan 94 are driven to transport the magnetic tape 71 at the selected tape speed.

If the tape speed mode for the specified program to be erased bar the user is lower than the tape speed mode suited to the transmission data rate of another program to be recorded in the case where the tape speed is set variably, the miltiprogram mode overwrite recording circuit described is unable to overwrite the specified program. For example, a program recorded in the ¼ speed mode can not be overwritten to record a program with a transmission data rate of 8 Mbps (½ speed mode). In this case, the circuit notifies that the program can not be overwritten by giving an alarm to the user. It is possible to automatically select a program which is suited to the transmission rate of the program to be recorded by overwriting. The tape speed mode can then be detected by decoding the extra header to be described below.

The signal indicating the tape speed mode is applied to the timing generation circuit 26. In accordance with the signal, the circuit 26 effects timing control for the write data as previously stated and on-off controls the recording amplifier 89 to control the period of data writing by double azimuth recording heads 70 on the tape 71 as illustrated in FIG. 17.

Figure 17A:
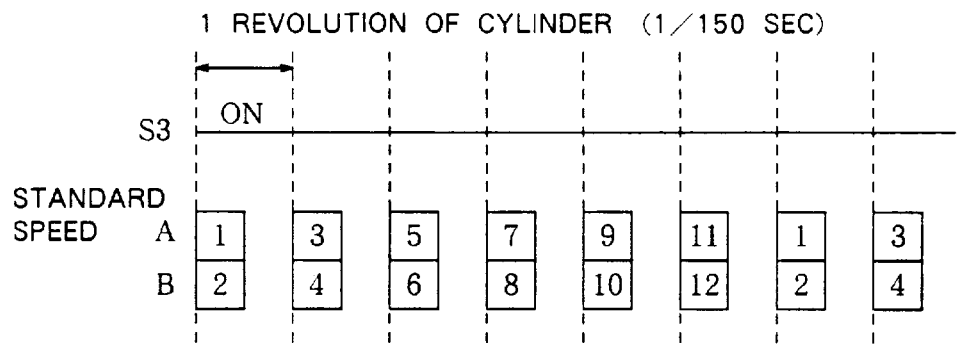
FIG. 17 is a diagram for illustrating a data writing control method for the recording circuit of FIG. 15.
Figure 17B:
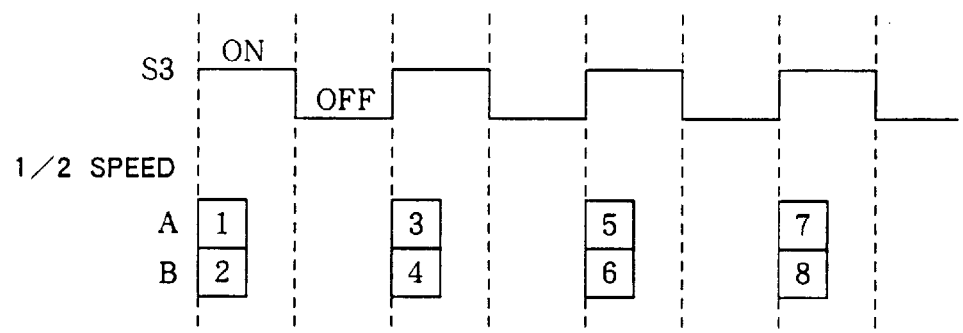
Figure 17C:
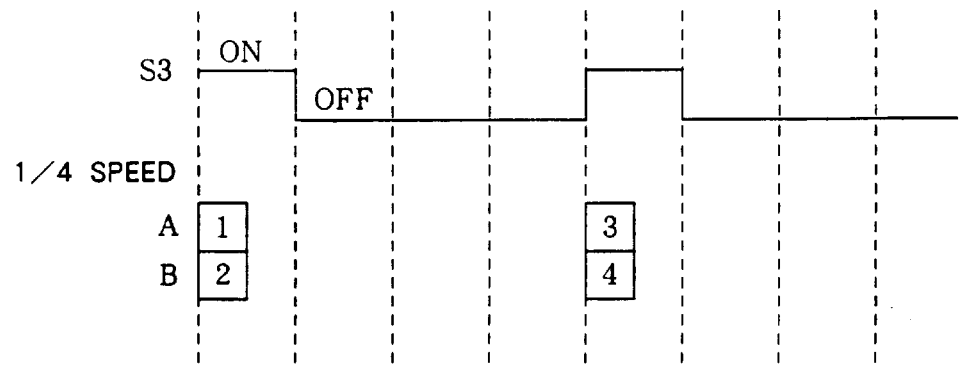

With reference to FIG. 17, the numerals in squares are numbers for the tracks to be recorded by the double azimuth heads A, B. S3 indicates the on-off state of the recording amplifier 89. In the standard speed mode, the amplifier 89 is always on as seen in FIG. 17(*a*). Tracks 1 and 2, tracks 3 and 4, ... are successively formed cyclically with the rotation of the rotary head cylinder.

According to the present embodiment, the cylinder rotates at a constant speed, so that if writing on the tape is done continually, for example, at a reduced tape speed of ½, the pitch of recorded tracks is also reduced to ½, resulting in an excessive area recording density and failing to effect normal recording.

The timing generation circuit 26 therefore on-off controls the recording amplifier 89 as shown in FIG. 17(*b*), such that while the heads 70 scan the tape twice in the ½ speed mode, the amplifier 89 is turned on only during the period of one scanning travel to record data on the tape, whereby the track pitch and the area recording density are made generally uniform. Similarly, in the ¼ speed mode, the amplifier 89 is turned on only during one scanning period per four periods as shown in FIG. 17(*c*), whereby the track pitch and the area recording density are made approximately uniform.

The timing generation circuit 26 of FIG. 15 further controls the memory control circuit 30 and the first data addition circuit 31 so that the recording signal is output with the turning on and off of the amplifier 89.

The magnetic tape 71 having image data recorded thereon in the tape speed mode described is played back by the playback circuit shown in FIG. 16.

First in the playback operation, the capstan 94 is driven at a predetermined tape speed, and ID data written to the resculting playback signal is separated off by a second data separation circuit 34 and fed to a tape speed detection circuit 95, which detects the tape speed mode included in the ID data. The detection signal is sent to a reel-capstan drive circuit 98. As a result, the reel 93 and capstan 94 are driven to transport the tape at a speed in conformity with the mode.

The tape speed mode detection signal provided by the detection circuit 95 is fed also to a playback timing generation circuit 96 at the same time, whereby a switch 97 interposed between a playback head 73 and a first data separation circuit 33 is on-off controlled. As is the case with the on-off control of the recording amplifier 89, the switch 97 is always held closed to pass the entire playback signal therethrough in the standard speed mode. In the ½ speed mode, the switch 97 is closed only during one scanning period while the head 73 scans the tape twice. In the ¼ speed mode, the switch 97 is closed only during one scanning period per four periods. Consequently, a signal is reproduced at the same data rate as the recording signal.

Figure 18:
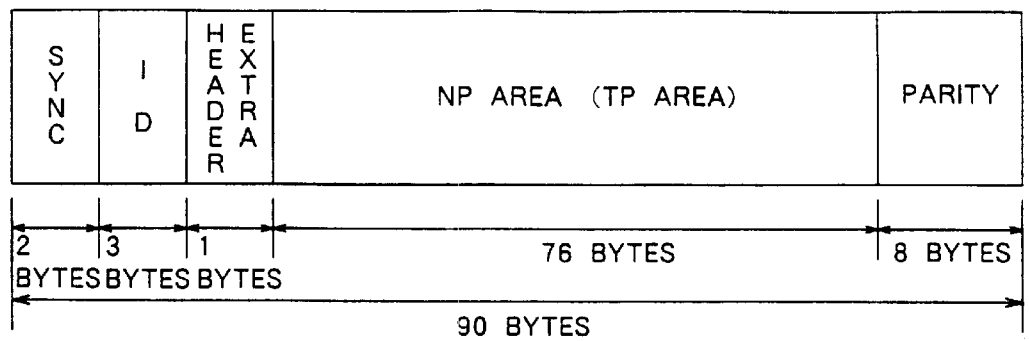
FIG. 18 is a diagram showing the data format of a sync block having all extra header added thereto.

Finally, the extra header will be described with reference to FIGS. 18 and 19. FIG. 18 shows the data format of one sync block including a sync data area (2 bytes), ID data area (3 bytes) and parity area (8 bytes) which are the same as in FIG. 24 already described. However, 1 byte within an image area (77 bytes) is used as the extra header. Accordingly image data is to be recorded in the remaining 76-byte area.

Figure 19:
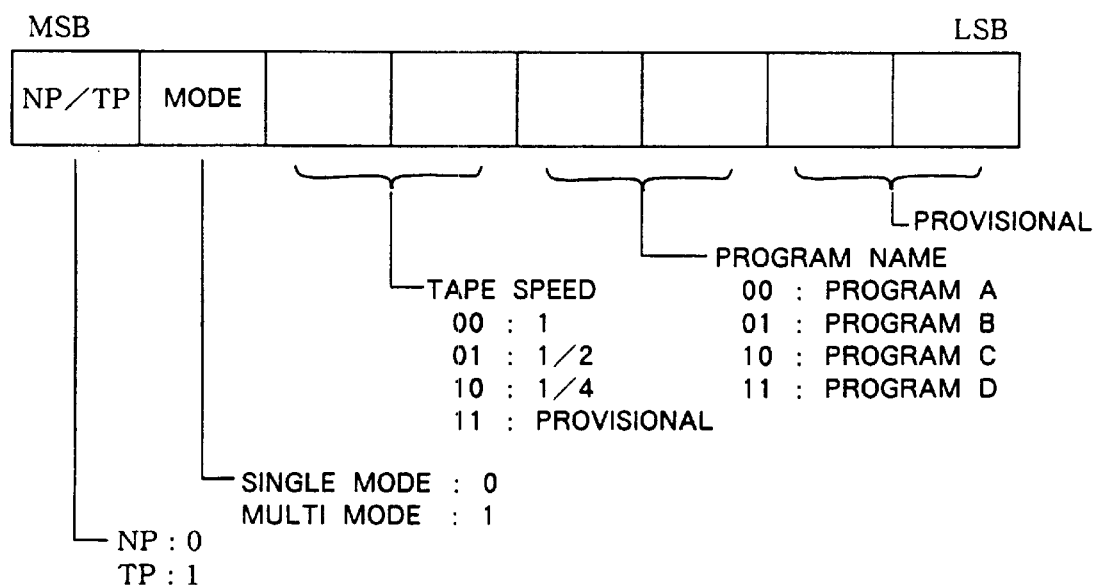
FIG. 19 is a diagram showing the details of the extra header.
Figure 21:
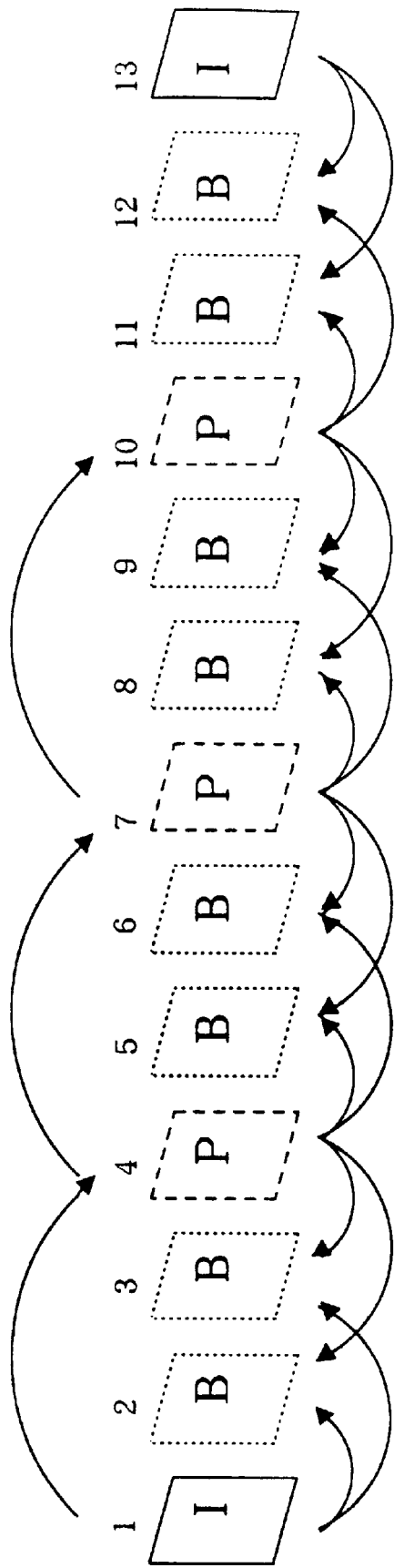
FIG. 21 is a diagram showing the frame structure of the MPEG method.
Figure 22:
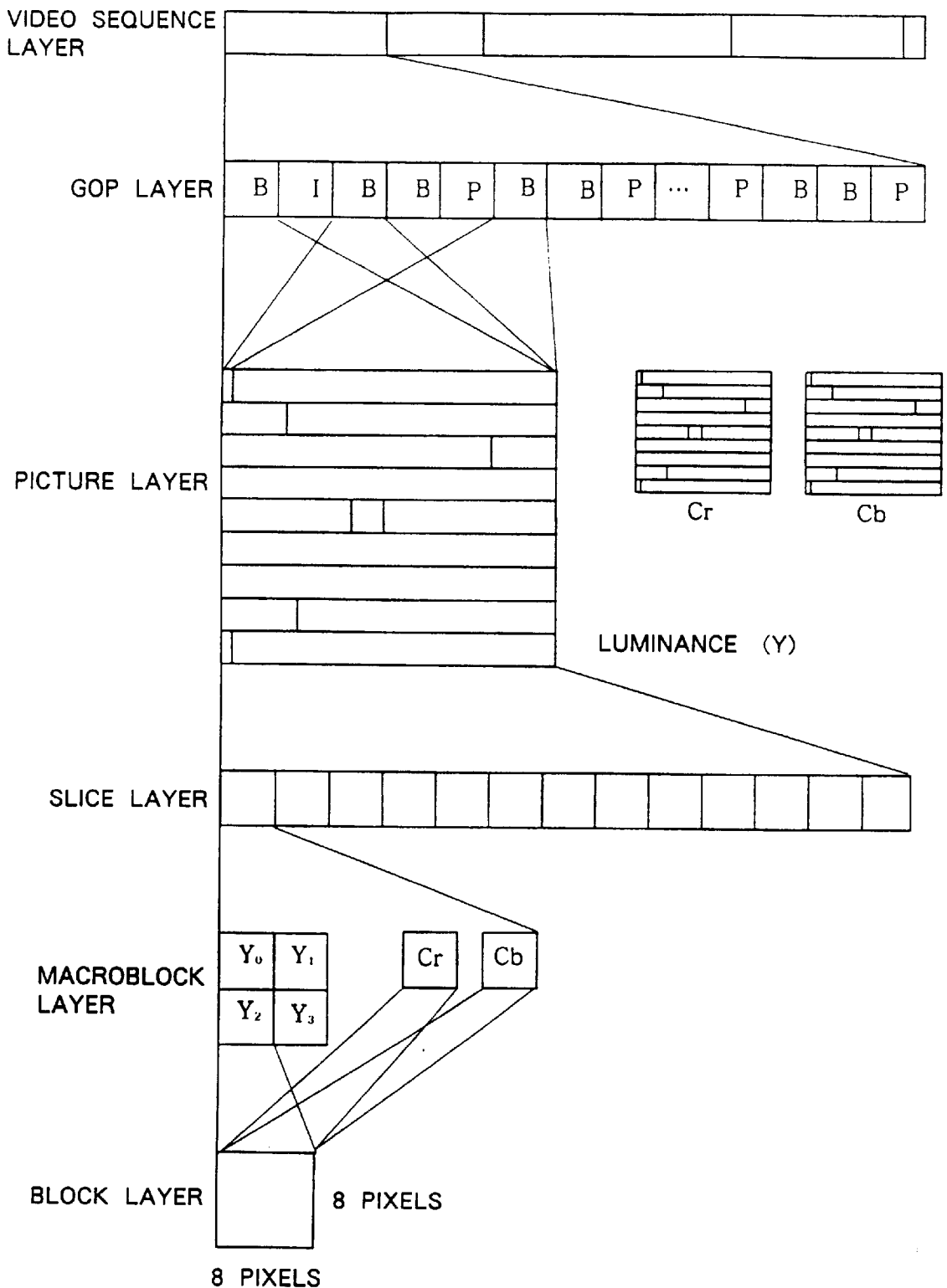
FIG. 22 is a diagram showing the hierarchical structure of data of the MPEG method.

FIG. 19 shows the details of the extra header. As illustrated, the seventh bit is used for indicating whether the following data is usual playback data NP or trick playback data TP, the sixth bit for indicating whether the recording and playback modes are single program mode or multiprogram mode, the fifth and fourth bits for indicating a particular tape speed mode for playback, and the third and second bits for showing the names of programs A, B, C, D recorded in the multiprogram mode.

The use of the extra head realizes the foregoing embodiments.

The above description of the embodiments is intended to illustrate the present invention and should not be contrued as limiting the invention defined in the appended claims or reducing the scope thereof. The structures of the invention are not limited to the foregoing embodiments but can of course be modified variously without departing from the spirit of the invention as set forth in the claims.

What is claimed is:

1. An image data recording method for use in tracing a tape with a signal recording head to form tracks having image digital data recorded thereon, the method comprising the steps of:

detecting a bit rate of digital image data to be recorded on the tape; and forming a first area having usual playback data recorded therein and a second area having trick playback data recorded therein wherein each one of a plurality of tracks provide blocks, the first and second areas are formed on at least one track included in each block, and the first area is diminished and the second area is enlarged as the detected bit rate decreases, wherein the enlarged second area comprises a basic area and a plurality of additional areas which can be traced by the head for trick playback, the basic area being the second area as formed when the usual playback data is at a maximum in bit rate, and the plurality of additional areas being added according to a predetermined priority order.

2. An image data recording method of claim 1, wherein the priority order is predetermined so as to enlarge the second area in a region permitting facilitated tracking control for trick playback.

3. An image data recording method of claim 1, wherein the priority order is predetermined so as to enlarge the second area in a region having a high probability of ensuring reproduction of data by trick playback.

4. An image data recording method of claim 1, wherein the same image data as in the basic area is recorded in the plurality of additional areas formed within a specified section of the tape.

5. An image data recording method of claim 1, wherein the trick playback data comprises main data required for trick playback and auxiliary data contributing to an improvement in image quality, the main data being recorded in the basic area, the auxiliary data being recorded in the additional area.

6. A method of recording image data representing a plurality of programs on a tape conjointly by forming signal recording tracks on the tape, the method comprising the steps of:

dividing the image data to be recorded on the tape for respective programs; and forming a usual playback data area and a trick playback data area on at least one track, the data areas being arranged longitudinally on the at least one track, wherein a trick playback frame is provided in response to a number of tracks in accordance with a number of speed multiplication for trick playback, the same trick playback data being repeatedly recorded from track to track in the trick playback data areas of the tracks within the same trick playback frame, at least one trick playback frame providing each of blocks, the image data for the plurality of programs being cyclically recorded in the respective blocks, each for one program.

7. An image data recording method of claim 6, wherein program data representing a program name is added to the image data in each of the trick playback frames and recorded on the tape.

8. An image data recording method of claim 6, wherein while the image data for the plurality of programs recorded on the tape is being reproduced in an overwrite mode, the trick playback frame for specified one of the programs is located and overwritten to record image data as to another program.

9. An image data recording method of claim 8, wherein a bit rate of the image data for said another program to be recorded by overwriting is detected, and the specified one of the programs to be overwritten is selected based on the detected bit rate.

* * * * *